US012141138B1

(12) United States Patent
Xiao et al.

(10) Patent No.: US 12,141,138 B1
(45) Date of Patent: Nov. 12, 2024

(54) DATA ACCESS LAYER FOR TRANSLATING BETWEEN A DATA STRUCTURE USED BY A FIRST SOFTWARE PROGRAM AND A PROXY TABLE USED BY A SECOND SOFTWARE PROGRAM

(71) Applicant: SAS Institute Inc., Cary, NC (US)

(72) Inventors: Yongqiao Xiao, Cary, NC (US); Patrick Nathan Koch, Morrisville, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 18/599,342

(22) Filed: Mar. 8, 2024

Related U.S. Application Data

(60) Provisional application No. 63/546,206, filed on Oct. 28, 2023, provisional application No. 63/539,756, filed on Sep. 21, 2023.

(51) Int. Cl.
*G06F 16/2452* (2019.01)
*G06F 8/41* (2018.01)

(52) U.S. Cl.
CPC .......... *G06F 16/2452* (2019.01); *G06F 8/457* (2013.01)

(58) Field of Classification Search
CPC .............................. G06F 16/2452; G06F 8/457
See application file for complete search history.

(56) References Cited

U.S. PATENT DOCUMENTS

2015/0006758 A1* 1/2015 Holtman ............... H04L 67/563
709/244
2017/0116335 A1* 4/2017 Baby ........................ G06F 8/65

OTHER PUBLICATIONS

Ali, A Framework for Creating Global Schema Using Proxy Tables from Distributed Heterogeneous Relational Databases in Multidatabase System, pp. 846-851 (Year: 2010).*
D'Silva, et al. "AIDA—Abstraction for Advanced In-Database Analytics" School of Computer Science, McGill University, Montreal, Canada, pp. 1400-1413 Year: 2018.
Busse, Ben "Combining Multiple Data Sources In One API With DreamFactory" 2023, pp. 1-4.
Openbridge Support "How To Use Views In Your Data Warehouse or Data Lake" www.blog.openbridge.com, Mar. 7, 2024, pp. 1-5.

* cited by examiner

*Primary Examiner* — Albert M Phillips, III
(74) *Attorney, Agent, or Firm* — Kilpatrick Townsend & Stockton LLP.

(57) ABSTRACT

In one example, a system can receive information about a data structure including a set of data entries. The system can generate a proxy data table including a set of columns. The system can use a data access layer to generate a mapping from the data entries to the columns. The system can receive an input to cause an operation to be performed on the data structure by performing the operation on the data structure. Generating a result can involve issuing read commands to the data access layer to perform the operation on the data structure such that the data access layer obtains the associated data entries and provides them as responses to the read commands by performing a translation between the data entries and the columns based on the mapping. The system can then output the result of the operation.

30 Claims, 18 Drawing Sheets

DATA ACCESS LAYER FOR TRANSLATING BETWEEN A DATA STRUCTURE USED BY A FIRST SOFTWARE PROGRAM AND A PROXY TABLE USED BY A SECOND SOFTWARE PROGRAM

REFERENCE TO RELATED APPLICATIONS

The claims the benefit of priority under 5 U.S.C. § 119(e) to U.S. Provisional Patent Application No. 63/539,756, filed Sep. 21, 2023, and U.S. Provisional Patent Application No. 63/546,206, filed Oct. 28, 2023, the entirety of each of which is hereby incorporated by reference herein.

TECHNICAL FIELD

The present disclosure relates generally to data access layers for computer systems. More specifically, but not by way of limitation, this disclosure relates to a data access layer for translating between a data structure used by a first software program and a proxy table used by a second software program.

BACKGROUND

Analytics software can be used to perform various operations on data located in in-memory data structures or persisted in datastores, such as databases. For example, some analysis operations using analytics software may involve loading data into memory from a remote datastore or application before performing the analysis operations. Data can be loaded into memory through direct loading, streaming, an Extract, Transform, Load (ETL) procedure, or other suitable process.

Remote datastores or applications can typically be accessed using a particular application programming interface (API) written in a particular programming language. In some cases, the analytics software may use a different API or a different programming language than the ones associated with the remote datastores or applications.

SUMMARY

One example of the present disclosure includes a system comprising one or more processors and one or more memories including instructions that are executable by the one or more processors for causing the one or more processors to perform operations. The operations can include receiving information about a data structure generated by a first software program and stored in a memory of the one or more memories, the data structure including a plurality of data entries, wherein the information about the data structure indicates a first set of properties for each data entry of the plurality of data entries. The operations can include generating a proxy data table that includes a plurality of columns, each column having an associated second set of properties, the proxy data table being usable as a proxy for the data structure by a second software program. The operations can include using a data access layer to generate a mapping that correlates the second set of properties of the plurality of columns of the proxy data table to the first set of properties of the plurality of data entries of the data structure. The operations can include receiving an input to the second software program from the first software program indicating an operation to be performed by the second software program on the data structure. In response to receiving the input, the operations can include instructing the second software program to perform the operation to generate a result, wherein the second software program is configured to issue read commands corresponding to the plurality of columns to the data access layer for performing the operation on the proxy data table; and the data access layer is configured to obtain the plurality of data entries and provide the plurality of data entries to the second software program as responses to the read commands, wherein: the data access layer is further configured to determine which of the plurality of data entries to provide in response to each of the read commands by performing a translation between the plurality of data entries and the plurality of columns based on the mapping; and output, by the second software program, the result to the first software program.

Another example of the present disclosure includes a method comprising operations. The operations can include receiving information about a data structure generated by a first software program and stored in a memory, the data structure including a plurality of data entries, wherein the information about the data structure indicates a first set of properties for each data entry of the plurality of data entries. The operations can include generating a proxy data table that includes a plurality of columns, each column having an associated second set of properties, the proxy data table being usable as a proxy for the data structure by a second software program. The operations can include using a data access layer to generate a mapping that correlates the second set of properties of the plurality of columns of the proxy data table to the first set of properties of the plurality of data entries of the data structure. The operations can include receiving an input to the second software program from the first software program indicating an operation to be performed by the second software program on the data structure. In response to receiving the input, the operations can include instructing the second software program to perform the operation to generate a result, wherein: the second software program is configured to issue read commands corresponding to the plurality of columns to the data access layer for performing the operation on the proxy data table; and the data access layer is configured to obtain the plurality of data entries and provide the plurality of data entries to the second software program as responses to the read commands, wherein: the data access layer is further configured to determine which of the plurality of data entries to provide in response to each of the read commands by performing a translation between the plurality of data entries and the plurality of columns based on the mapping; and outputting, by the second software program, the result to the first software program.

Another example of the present disclosure includes a non-transitory computer-readable medium comprising program code that is executable by one or more processors for causing the one or more processors to perform operations. The operations can include receiving information about a data structure generated by a first software program and stored in a memory, the data structure including a plurality of data entries, wherein the information about the data structure indicates a first set of properties for each data entry of the plurality of data entries. The operations can include generating a proxy data table that includes a plurality of columns, each column having an associated second set of properties, the proxy data table being usable as a proxy for the data structure by a second software program. The operations can include using a data access layer to generate a mapping that correlates the second set of properties of the plurality of columns of the proxy data table to the first set of properties of the plurality of data entries of the data structure. The operations can include receiving an input to the second software program from the first software program indicating an operation to be performed by the second software program on the data structure. In response to receiving the input, the operations can include instructing the second software program to perform the operation to generate a result, wherein: the second software program is configured to issue read commands corresponding to the plurality of columns to the data access layer for performing the operation on the proxy data table; and the data access layer is configured to obtain the plurality of data entries and provide the plurality of data entries to the second software program as responses to the read commands, wherein: the data access layer is further configured to determine which of the plurality of data entries to provide in response to each of the read commands by performing a translation between the plurality of data entries and the plurality of columns based on the mapping; and outputting, by the second software program, the result to the first software program.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
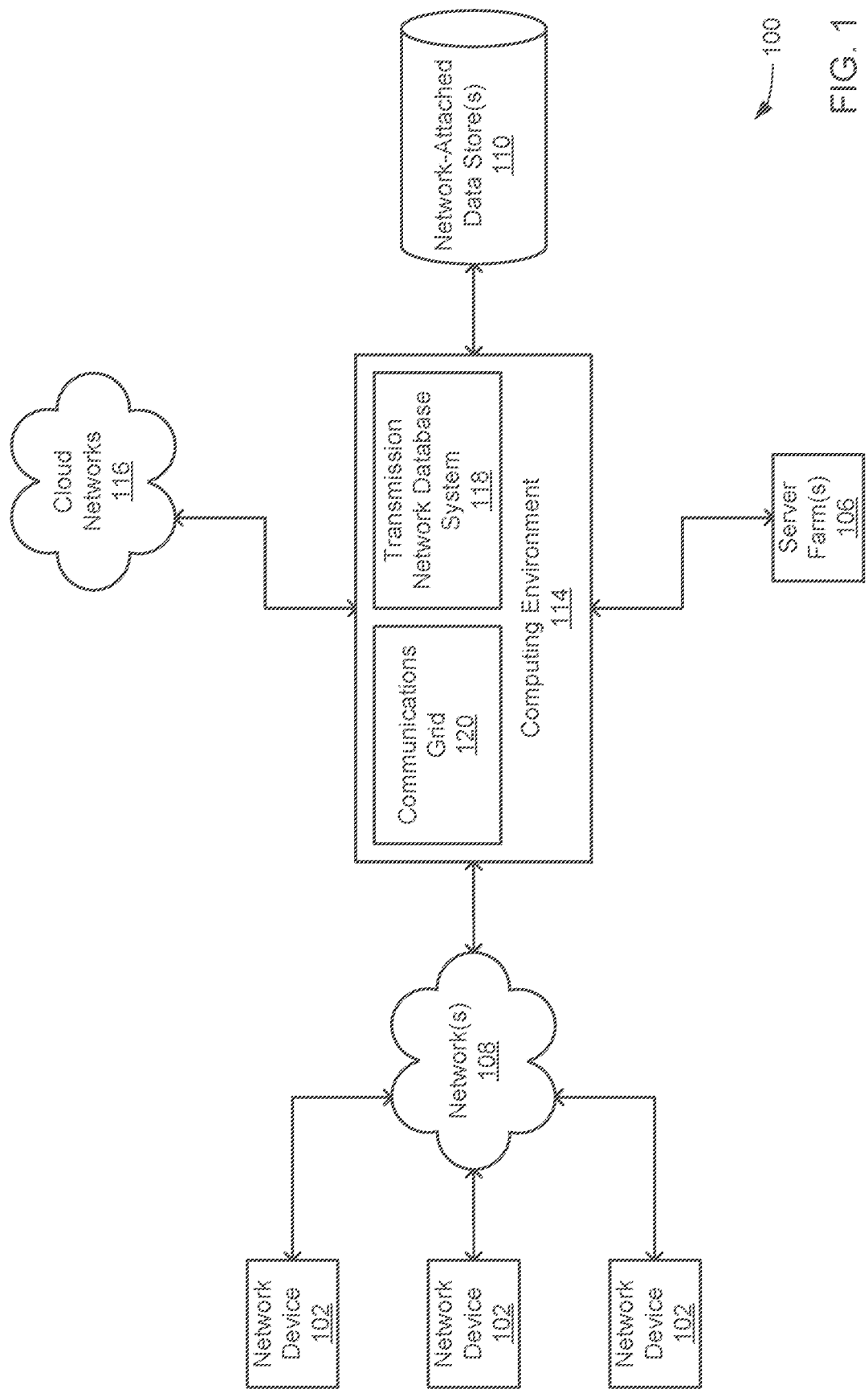
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

For computationally-expensive analysis, operating on data in-memory is generally preferable to piecemeal operations on data hosted remotely. For example, data may be loaded in the memory of another application or contained in a remote datastore, such as a database or hard disk drive. As a result, analytics software may load data from such remote sources into local memory before performing analysis operations. However, this loading process can be slow and inefficient, particularly for large data sources. It may be desirable for the analytics software to operate directly on the data without the need to first load the data into its own memory.

Additionally, users of analytics software may wish to perform analysis operations on data in the memory of another application executing at the same time as the software. In addition to the inefficiency of copying or transferring data prior to the analysis mentioned above, users may wish to avoid loading data into memory for practical reasons. For example, an application written in a particular programming language and exposing a compile-time or runtime application programming interface (API) native to the particular programming language can have data loaded into a memory in a data structure native to the particular programming language. Even if the application is accessible to the analytics software over a network, the analytics software may have an API that is incompatible with the API of the application or may be written in a different programming language altogether.

Existing approaches may thus require analytics users to choose to between two suboptimal processes to perform analysis operations-either copying all of the data to their local system and loading the data into memory or attempting to access the data remotely via an API that may be incompatible.

Some examples of the present disclosure can overcome one or more of the abovementioned problems by providing a data access layer that can translate between a data structure used by a first application and a proxy data table used by a second application, to allow the second application to perform operations associated with the data in the data structure without loading all of the data into memory. For example, a first application may load a data structure into memory for performing various functions. Some of the functions may involve issuing analytics commands to second application, which can be analytics software to perform analytics operations on the data in the data structure. But because the analytics software may not have access to the data structure, in a conventional scenario, the analytics software may be unable to conduct the analytics operations without first retrieving and loading a full copy of the data from the data structure into memory, which can be slow and inefficient. Some examples described herein can overcome this problem through the combined use of a proxy data table and an improved data access layer. The proxy data table can be local to the analytics software and serve as a proxy for the data structure associated with the first application. In response to receiving the analytics commands from the first application, the analytics software can issue commands to the data access layer for performing operations on the proxy data table to perform the analytics operations. Based on the issued command, the data access layer can identify and retrieve the corresponding data from the data structure and return it to the analytics software, as if the data came from the proxy data table. As a result of this "illusion," the analytics software may not even be aware of the existence of the data structure and may "think" it is performing operations on the proxy data table. The analytics software can then perform the requested analytics operations using the returned data. These techniques can allow the analytics software to perform the requested analytics operations without needing to retrieve and load a full copy of the data into memory. The output of the analysis operations can then be provided to first application, which can continue to execute in parallel with the analysis, without any requirement to first copy or transfer data elsewhere to perform the desired analyses.

To implement the above process, the data access layer can first receive information about the data structure associated with the first application. The data structure can be stored in a memory of the first application. For example, the analytics software and the first application may be executing together on the same computer system but have separate memory regions such that the data structure in the memory of the application is inaccessible to the analytics software. The information about the data structure may be, for example, input to the analytics software by a user of the application or sent automatically in response to an indication to perform an analysis operation.

The data structure may be, for example, a data table including a number of data entries. The data entries may be characterized by properties such as the name of the entry, data type, precision, and so forth. The information may include an identification of the data structure as well as such properties for each data entry of the data entries in the data structure.

The analytics software can generate a proxy data table which is usable as a proxy for the data structure of the application. The proxy data table can include a number of columns, each column itself having a set of properties. The analytics software can use a data access layer to generate a mapping that correlates the properties of the columns of the proxy data table to the properties of the data entries of the data structure. The proxy data table may be defined using columns and column properties. In this respect, the proxy data table may resemble a data table having only a header row (or other metadata storage location) that includes the column properties and with no data rows otherwise defined.

A simple example involves a data structure that is itself a table. In that case, the data entries (e.g., the table cells of the data structure) each map to a similarly situated and configured column of the proxy data table. The mapping can dynamically compute rows for the proxy data table, resulting in "virtual" cells that can be mapped to the table cells of the data structure. However, during the mapping, the proxy data table may remain empty and may not contain the data from the data structure or a copy thereof, even ephemerally. After the mapping is generated, the analytics software can attempt to perform operations on the data structure. This may involve issuing read commands to the data access layer to perform the corresponding read commands on the proxy data table. The data access layer, in turn, performs the reads on the data structure in the memory of the other application using the mapping. In some examples, the data access layer can facilitate access to a data buffer storing the relevant data rather than to the data structure itself, which may provide greater efficiency and speed during analysis operations.

In some examples, the analytics software can be triggered to perform analytics operations by the first application. For example, the analytics software can receive, from the first application, an input indicating an operation to be performed by the analytics software on the data structure. For example, a user of the first application may desire a particular analysis to be performed on the data in the data structure. The input to the analytics software can indicate, for example, the desired analysis, identifying information about the data structure, authentication or authorization information, and so on. In response to receiving the input, the analytics software then issues commands for performing the operation to the data access layer to generate a result. The commands may be, for example, read commands for certain elements of the proxy data table as required for the particular operation.

For example, a simple operation may involve sorting a set of numerical values contained in the data structure. The analytics software can issue commands to cause read commands to be executed against the proxy data table via the data access layer to obtain the values to be sorted. The data access layer can detect and/or intercept those commands and responsively obtain the requested data entries and provide the data entries to the analytics software as responses to the read commands. In this way, the data access layer can function as a bridge between the proxy data table and the data structure, such that the details of the underlying data structure are invisible to the analytics software. The data access layer thus effectively performs a translation between the data entries of the data structure and the columns of the proxy data table based on the mapping.

The analytics software can then output the result to the application. For example, in the sorting example above, the sorted numerical values can be provided to the application. Depending on the particular analysis and particularly for large sets of data, the result may be returned to the application in one or more portions. For instance, some approaches to sorting a large set of numerical values may involve first sorting a subset of the set, and then iteratively sorting the full set.

In some examples involving more complex operations such as the logistic action, the analytics software can issue commands to cause a number of read commands to be executed against the proxy data table via the data access layer to obtain the values in groups or batches. In this case, the data access layer can again intercept the commands and responsively obtain the requested data entries and provide the data entries to the analytics software as responses to the read commands using a suitable mechanism for batch processing. For example, the batched read commands can be used to iteratively populate a data structure (e.g., an array) or to execute batch processing on subsets of the read data entries.

These illustrative examples are given to introduce the reader to the general subject matter discussed here and are not intended to limit the scope of the disclosed concepts. For instance, although the above examples involve analytics software, similar principles can be applied to other kinds of software. Thus, the principles described herein are not intended to be limited to analytics software. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
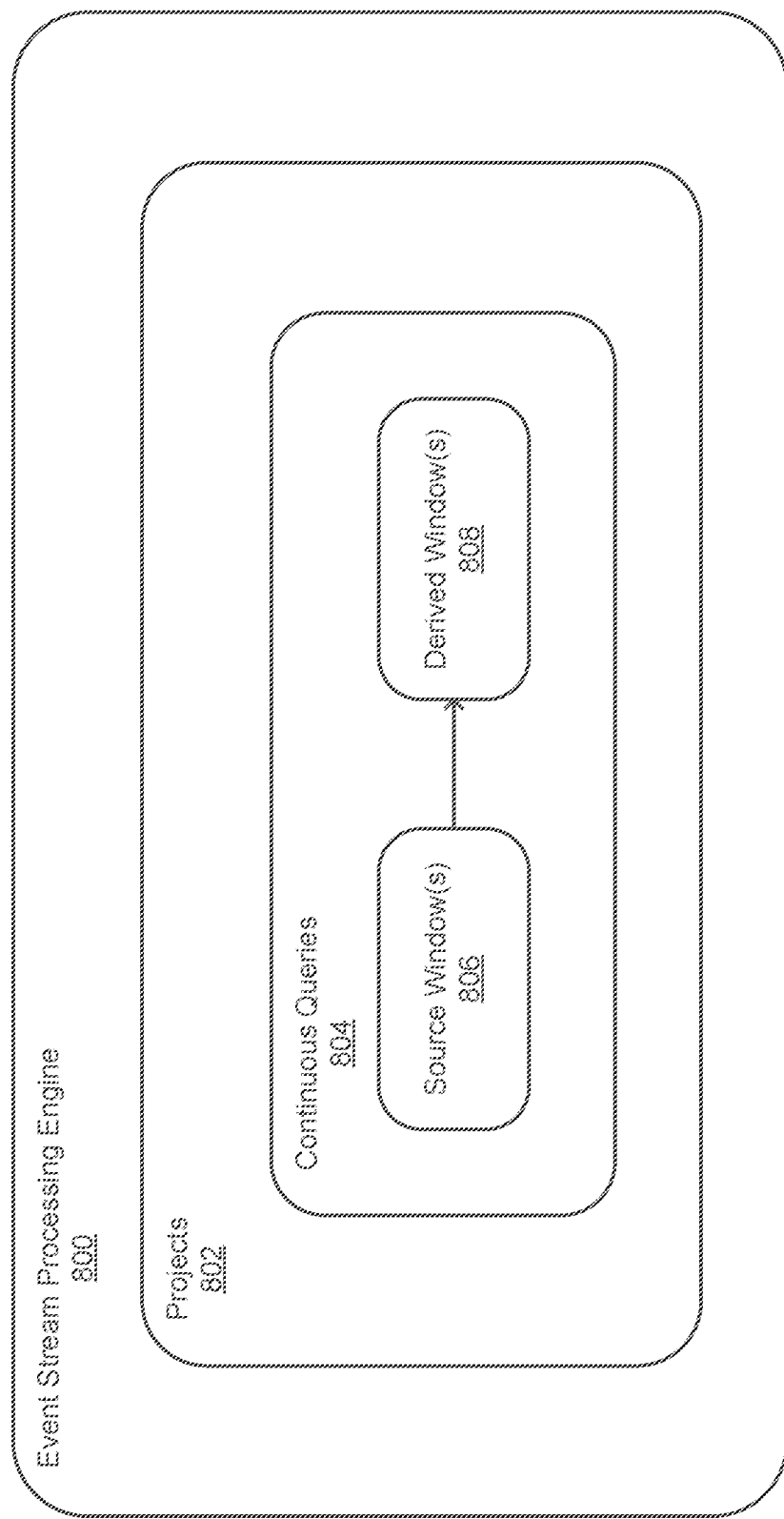
FIG. 8 shows a block diagram including components of an Event Stream Processing Engine (ESPE) according to some aspects of the present disclosure.
Figure 9:
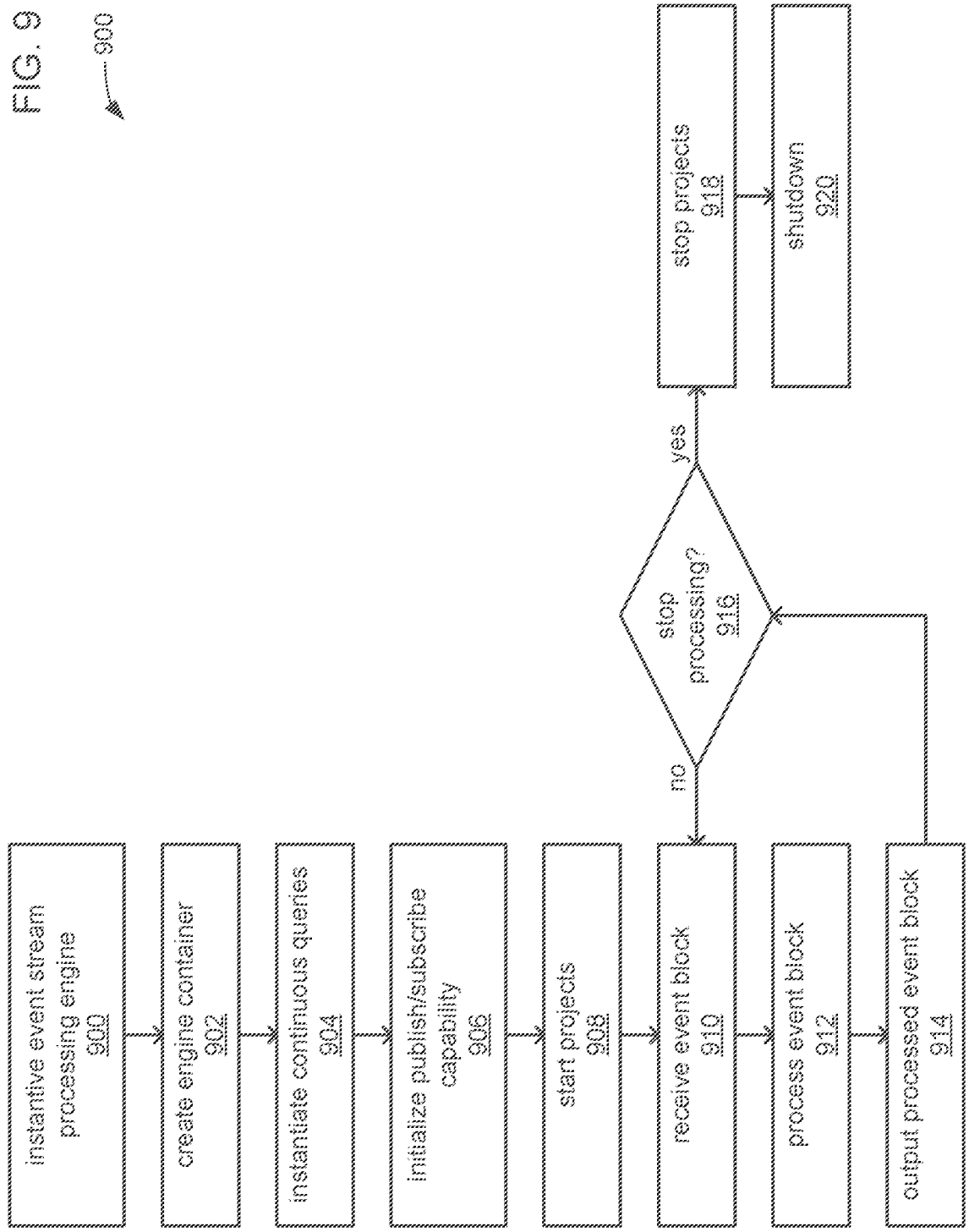
FIG. 9 shows a flow chart of an example process including operations performed by an event stream processing engine according to some aspects of the present disclosure.
Figure 10:
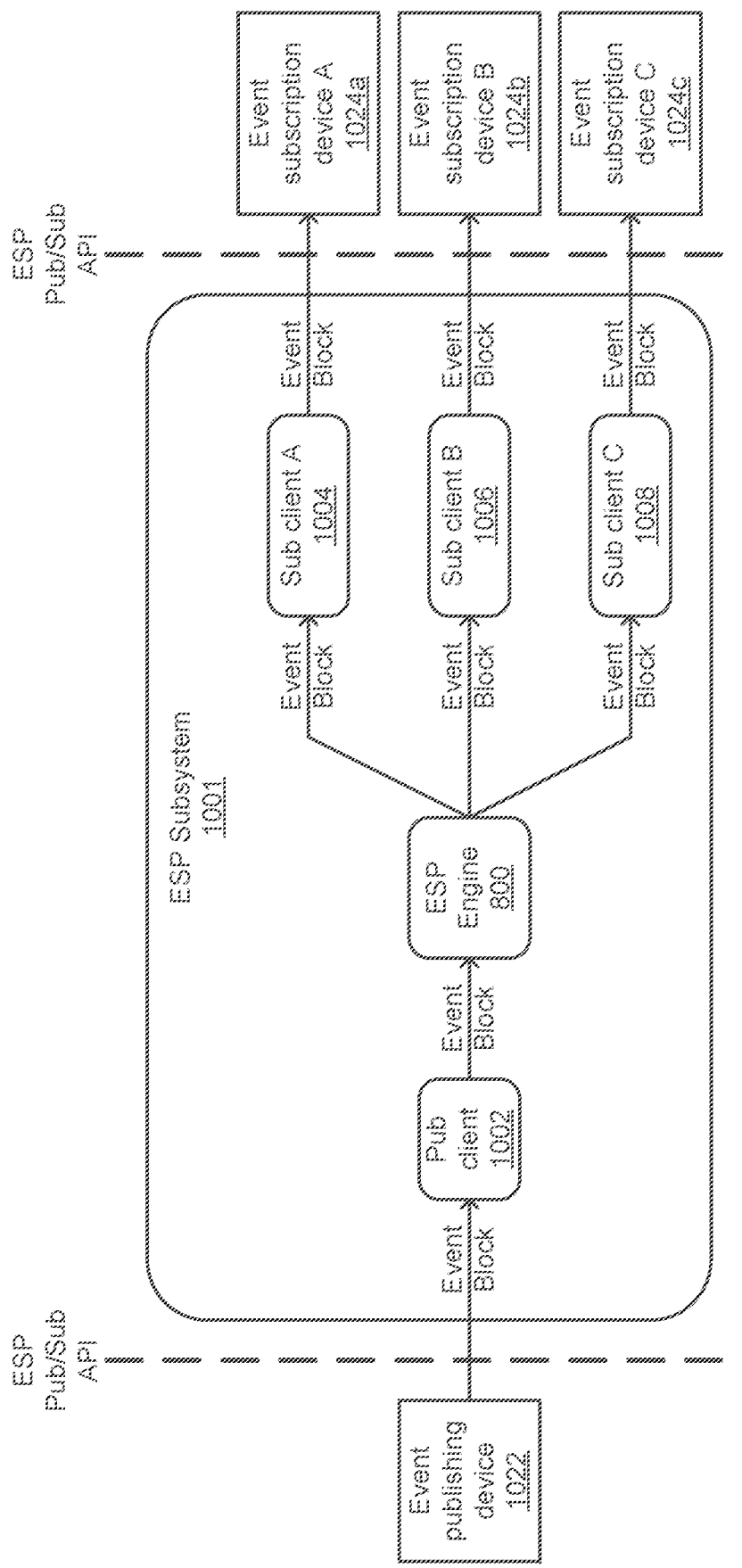
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users.

The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
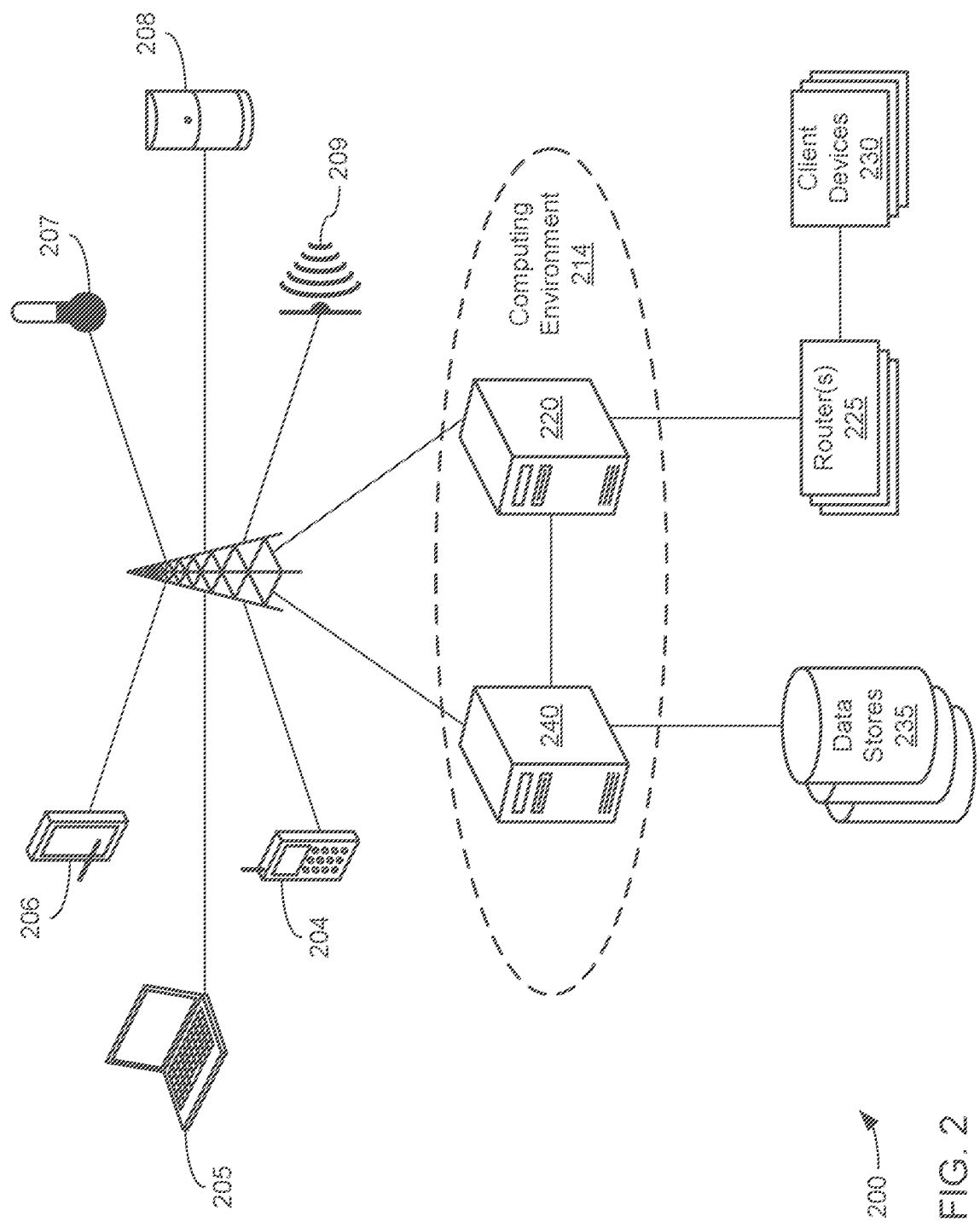
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, all communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computer systems (e.g., a home computer, a laptop computer, a tablet, a personal digital assistant (PDA), a computer system, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
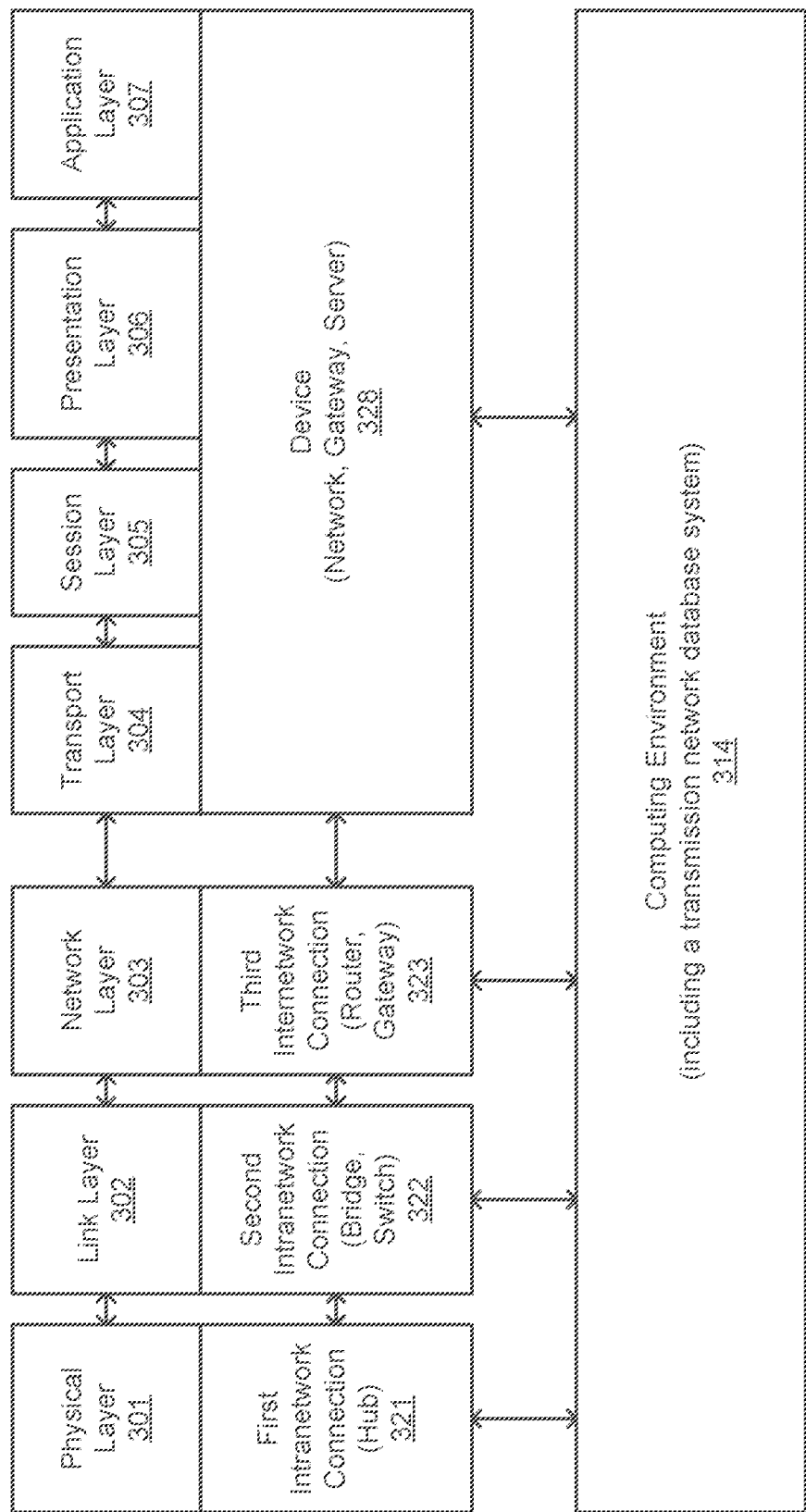
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
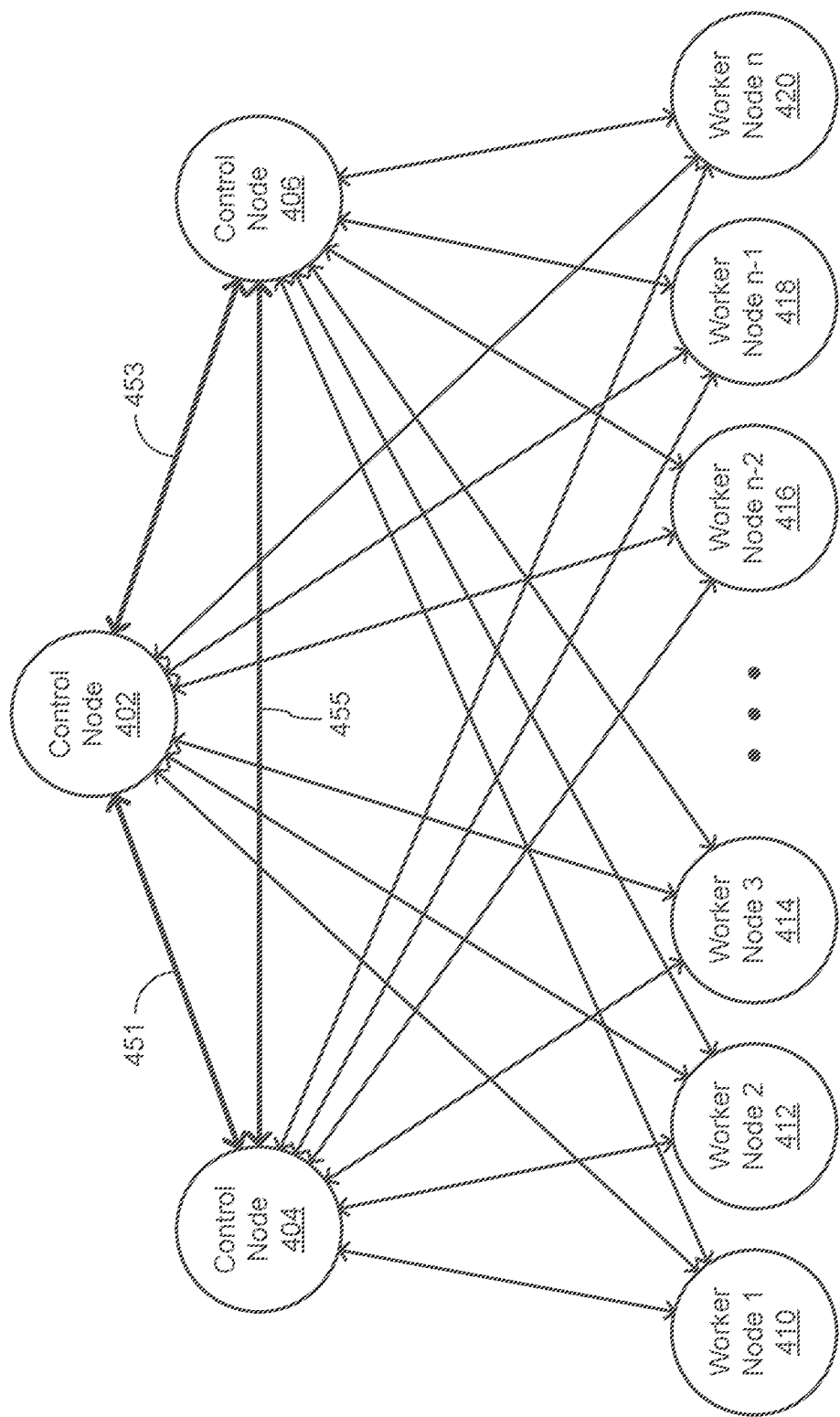
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
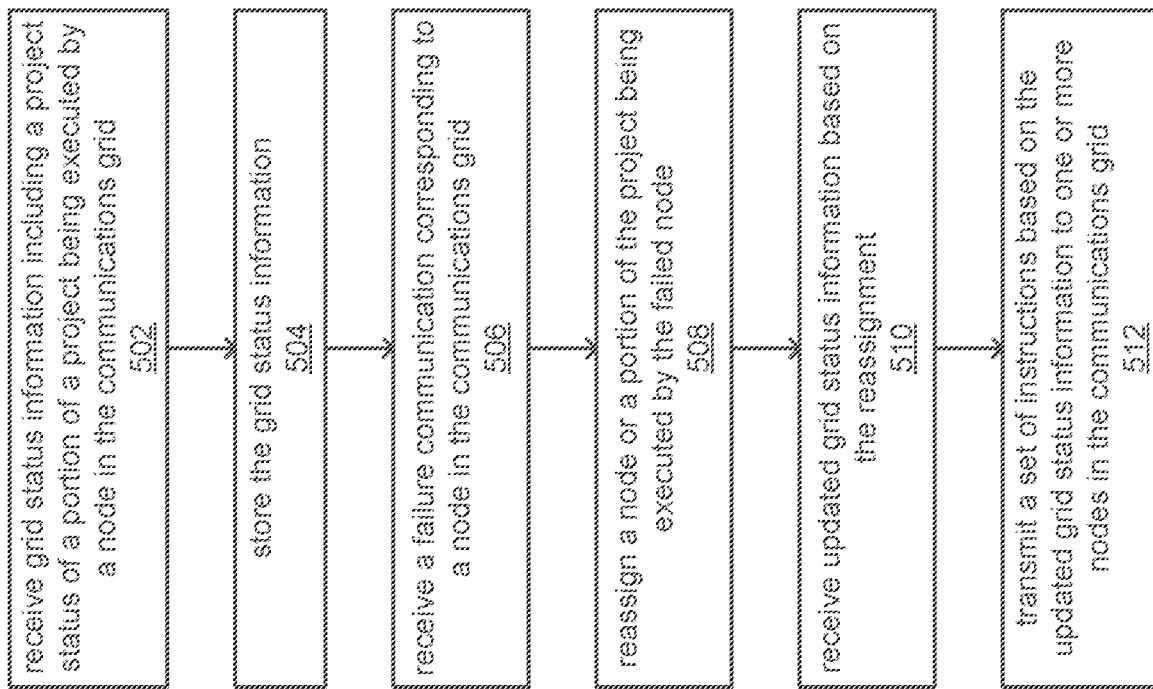
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
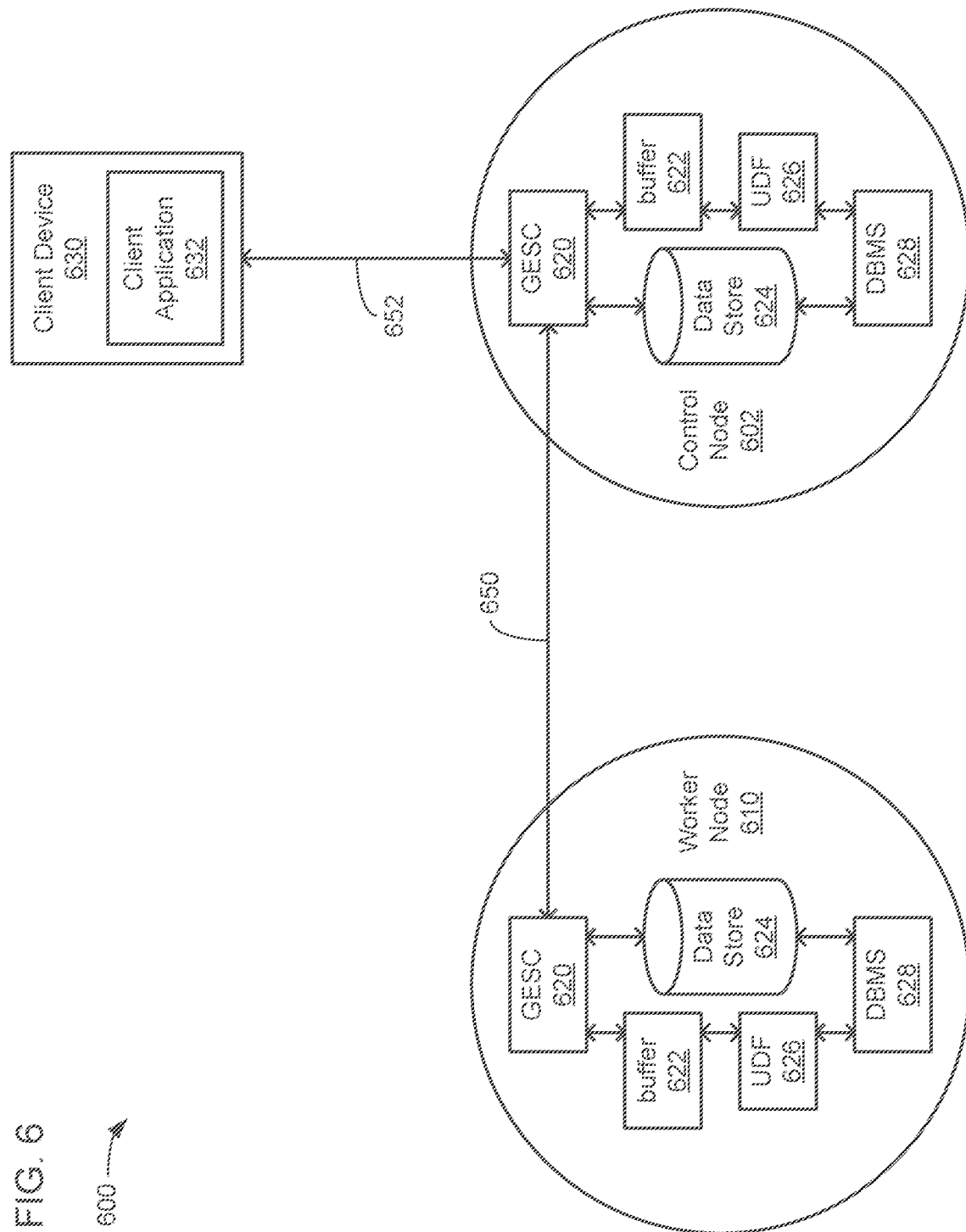
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
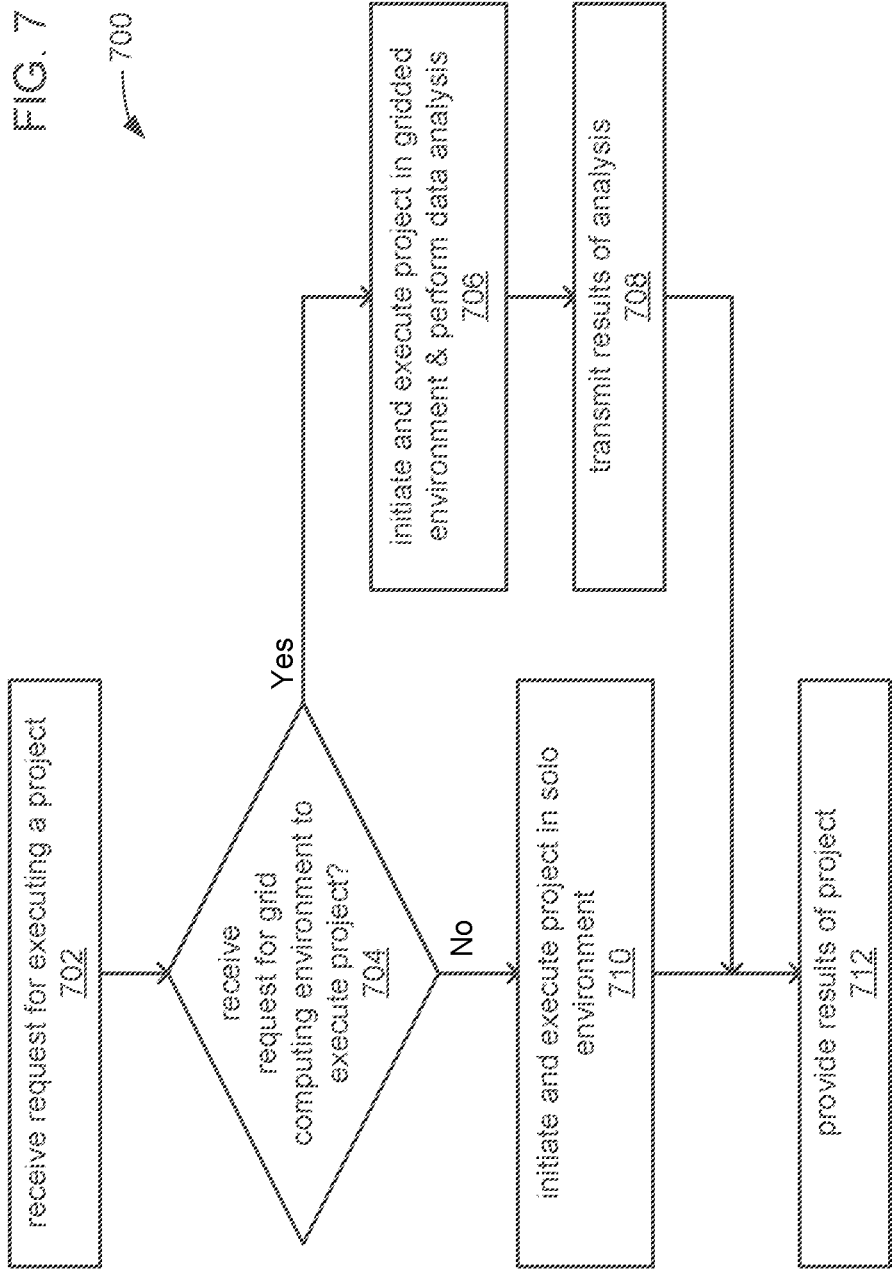
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computer system of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computer systems of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computer system. The computer system includes, but is not limited to, a processor and a computer-readable medium operably coupled to the processor. The processor is configured to execute an ESP engine (ESPE). The computer-readable medium has instructions stored thereon that, when executed by the processor, cause the computer system to support the failover. An event block object is received from the ESPE that includes a unique identifier. A first status of the computer system as active or standby is determined. When the first status is active, a second status of the computer system as newly active or not newly active is determined. Newly active is determined when the computer system is switched from a standby status to an active status. When the second status is newly active, a last published event block object identifier that uniquely identifies a last published event block object is determined. A next event block object is selected from a non-transitory computer-readable medium accessible by the computer system. The next event block object has an event block object identifier that is greater than the determined last published event block object identifier. The selected next event block object is published to an out-messaging network device. When the second status of the computer system is not newly active, the received event block object is published to the out-messaging network device. When the first status of the computer system is standby, the received event block object is stored in the non-transitory computer-readable medium.

Figure 11:
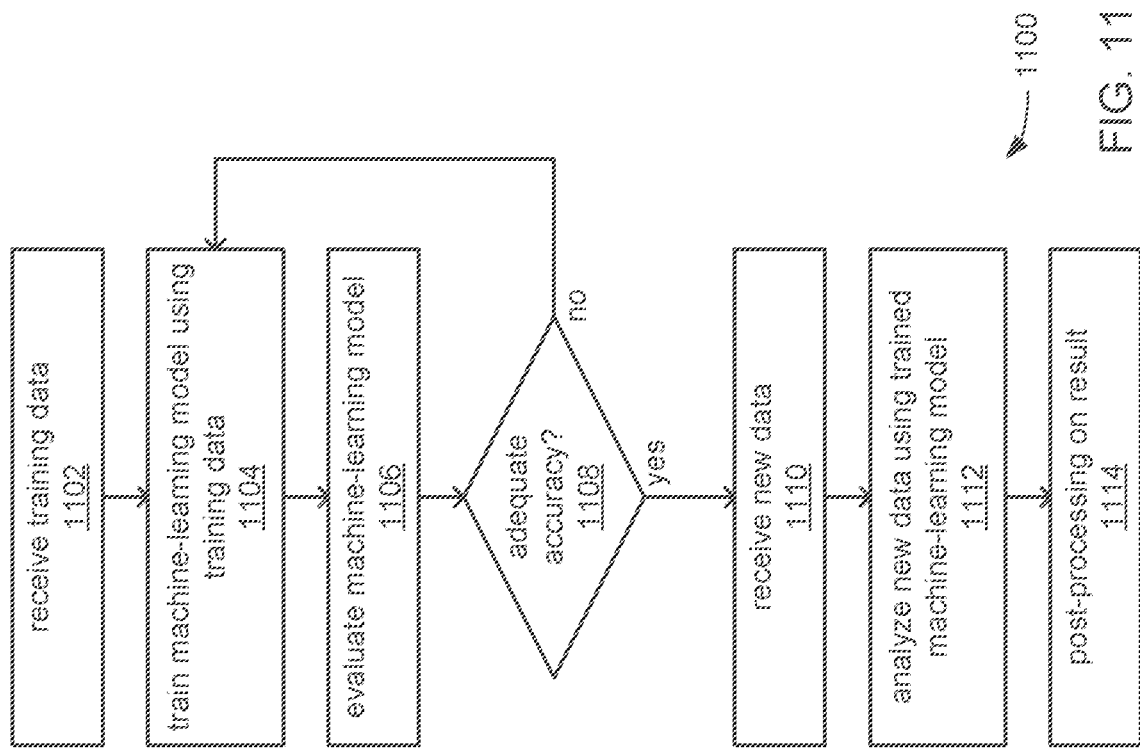
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
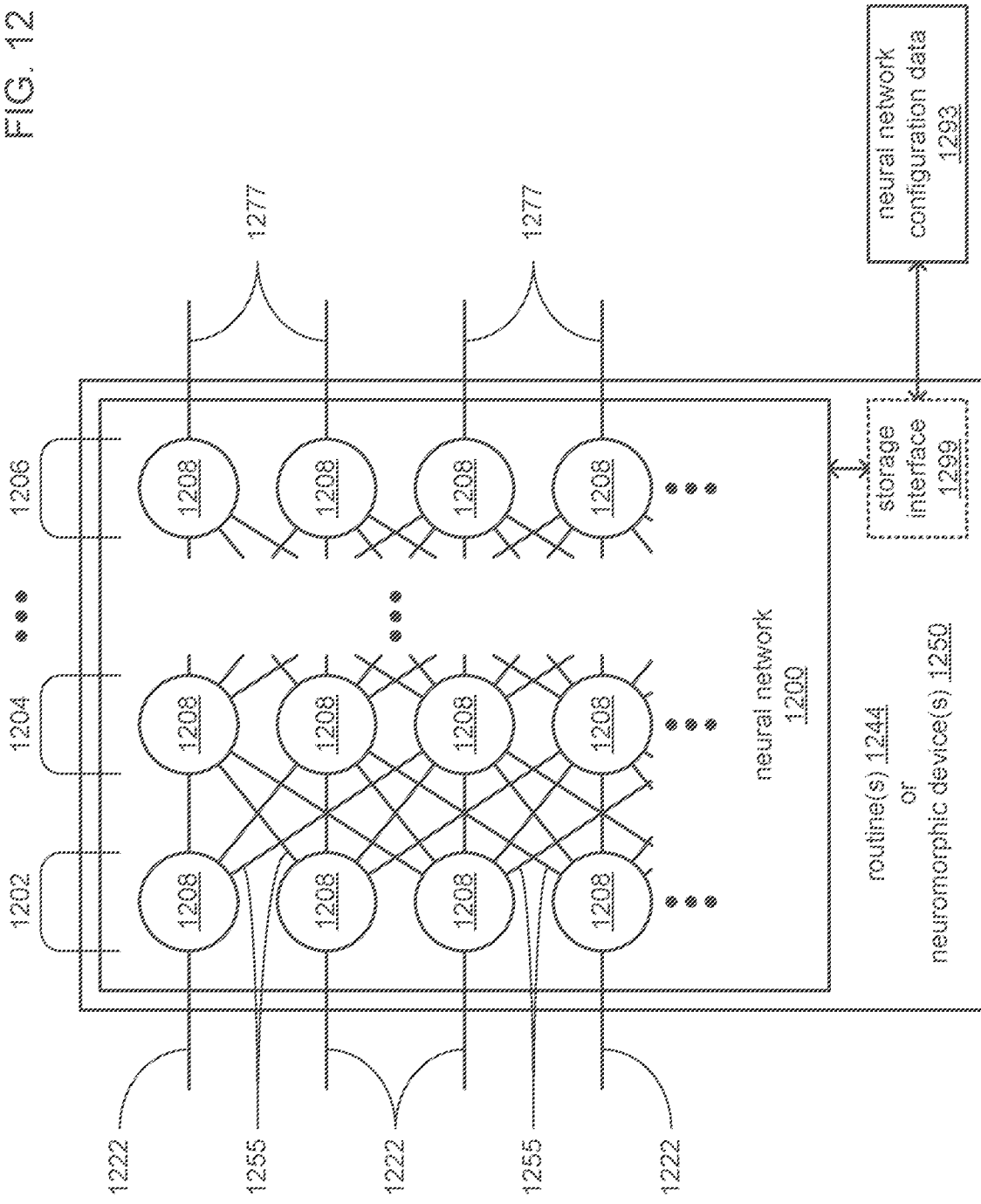
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computer system or multiple computer systems, such as the communications grid computing system 400 discussed above.

Implementing some examples of the present disclosure at least in part by using machine-learning models can reduce the total number of processing iterations, time, memory, electrical power, or any combination of these consumed by a computer system when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
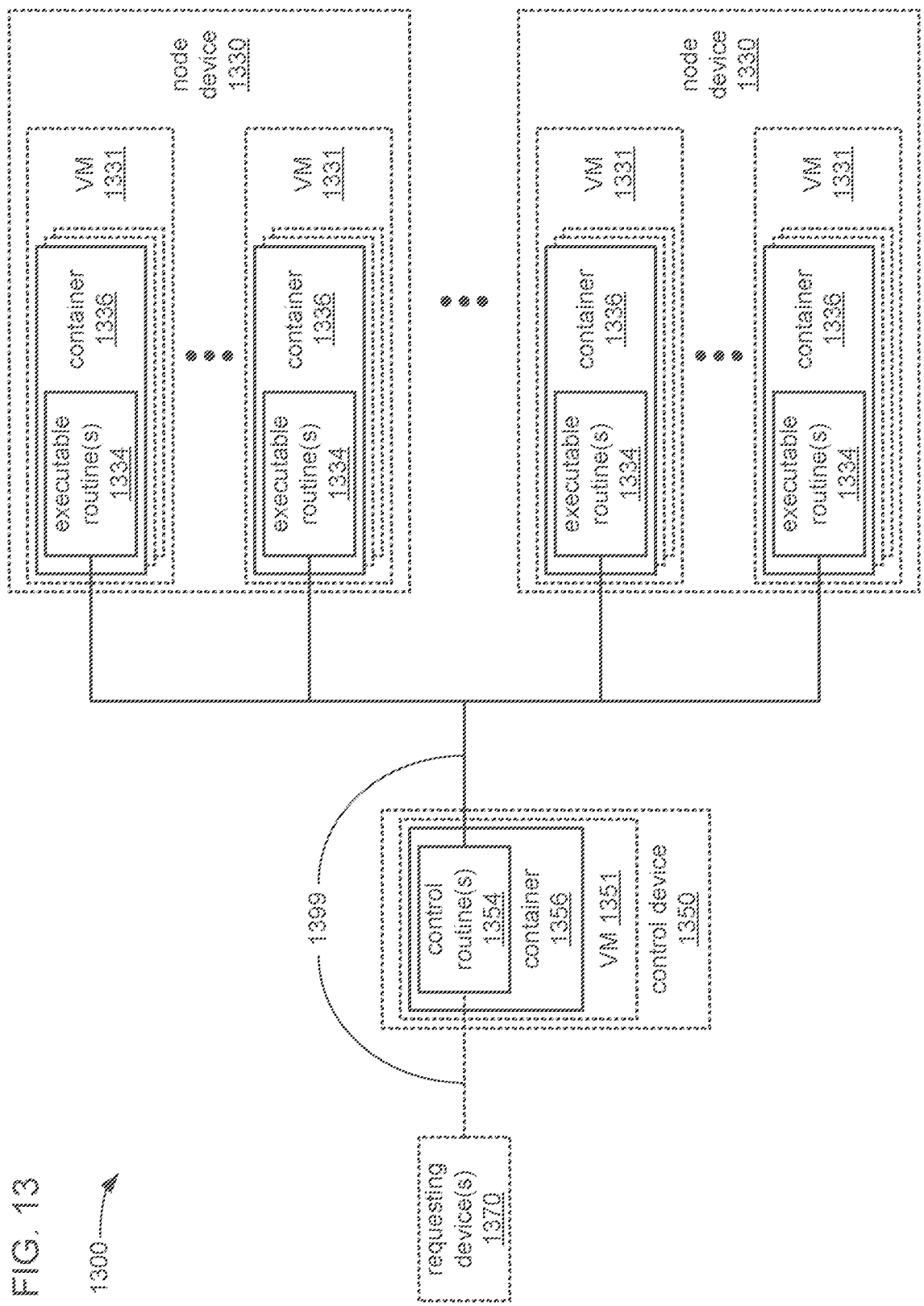
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
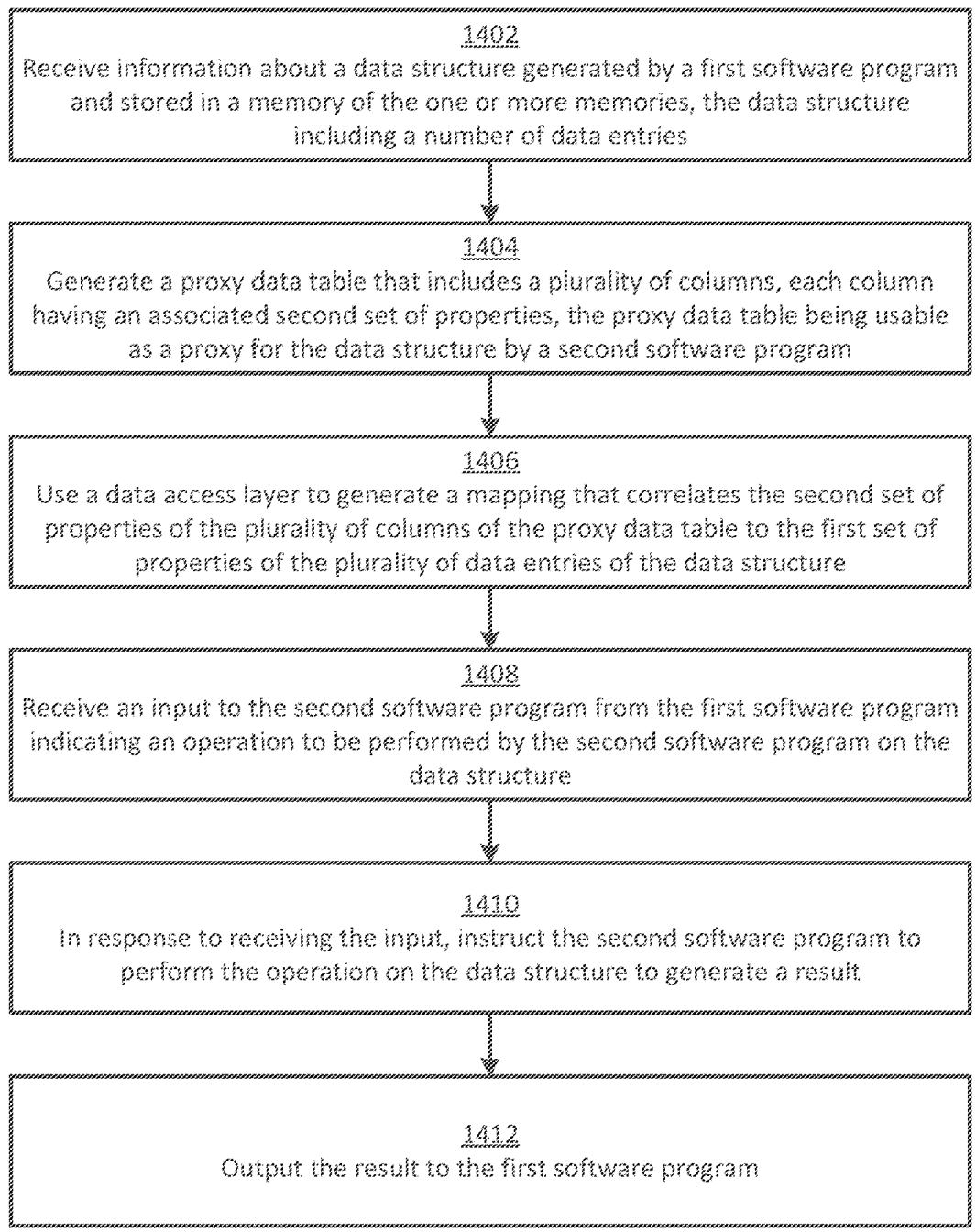
FIG. 14 shows a flowchart of an example of a process for implementing a data access layer for translating between a data structure used by a first software program and a proxy table used by a second software program, according to some aspects of the present disclosure.

FIG. 14 shows a flowchart of an example of a process for implementing a data access layer for translating between a data structure used by a first software program and a proxy table used by a second software program, according to some aspects of the present disclosure. Other examples may involve more operations, fewer operations, different operations, or a different order of operations than is shown in FIG. 14.

In block 1402, a computer system receives information about a data structure that is generated by a first software program and stored in a memory. For example, the memory may be memory available to the executing first software program such as heap or stack space. In another example, the data structure may be persisted to a storage location such as a database, hard disk, network storage location, cloud storage location, and so forth.

The data structure includes a set of data entries. The data structure may be, for example, a two-dimensional data table including one or more rows and one or more columns. In this example, each data entry corresponds to a cell in the table. Other examples of data structures include arrays, linked lists, trees, graphics, associative arrays, non-relation database entities, and so on. Each data entry may have a corresponding data type. For example, the data entries in a column may all be integers. In another example, the data entries in a column may be explicitly typed as indicated by, for instance, a property of the column.

The information about the data structure indicates a first set of properties for each data entry of the set of data entries. For example, for a data structure that is a table, each data entry (or cell) can have a data type corresponding to its column. In this example, the first set of properties includes properties for each cell such as its coordinates in the table, the data type of its containing column, the width or precision of its values, limitations (e.g., can contain null or empty values), security constraints, and so on.

In some examples, the information may be received by a data access layer. As described in more detail below, the data access layer can act as a bridge between proxy data table and the data structure. The information can thus be used by the data access layer for initialization or configuration. The information can likewise be received by other components, such as other components of the first or second software programs.

The analytics software can be used for performing a variety of analyses on large, heterogeneous datasets from disparate sources. In this example process, the first software program can correspond to a first programming language while the second software program can correspond to a second, different programming language. For instance, the first software program can be configured to interpret a first programming language while the second software program can be configured to interpret the second programming language.

The first programming language and the second programming language may be different programming languages. The first programming language may be, for example, a programming language that is compiled and executed such as C, C++, or Java. In some examples, the first programming language is an interpreted programming language or scripting language such as Python, R, bash, or Ruby. On the other hand, the second programming language may be a language used by the second software program such as an analytics software scripting language. However, the second programming language can likewise be one that is compiled and executed or interpreted.

In the analytics example, the second software program can be caused to perform the various analyses using the second programming language. However, outputs of the execution of instructions authored using the second programming language may not be interpretable by the first software program that can interpret the first, different programming language. For instance, even if the first software program exposes an API that is accessible by the second software program, runtime access to the API of the first software program may not be available.

However, in some examples, the second software program can be configured to interface with the first software program. For example, the techniques described herein can allow for a multi-language architecture that enables the first software program, which can be written in any programming language, to interface with the second software program, which can also be written in any programming language, through the data access layer using a mapping . . . . For example, the multi-language architecture can be configured to enable the first software program to execute APIs exposed by the second software program using the first programming language.

In block 1404, the computer system generates a proxy data table that includes a set of columns, each column having an associated second set of properties. For example, the analytics software can generate the proxy data table in response to receiving the information about the data structure as described above with respect to block 1402. The proxy data table can be used as a proxy for the data structure by the second software program. In some examples, the proxy data table does not contain data. The proxy data table may be defined using only columns and column properties. The proxy data table may include only a header row (or other metadata storage location) defined that includes the column properties and with no data rows otherwise defined.

For example, the proxy data table can be used in conjunction with the data access layer, as described below, to provide access to the data structure to the second software program. Analysis operations can be performed by the second software program by sending suitable commands to the data access layer to operate on the proxy data table. Through this process, the operations can be performed, by the data access layer, on data in the data structure instead of the potentially empty proxy data table, according to the mapping described below in block 1406.

In block 1406, the computer system uses a data access layer to generate a mapping that correlates the second set of properties of the set of columns of the proxy data table to the first set of properties of the set of data entries of the data structure. The data access layer thus acts as a bridge between the columns of the proxy data table and the data entries of the data structure. The mapping can correlate the data entries of the data structure to dynamically created cells. For example, the computer system may dynamically compute rows for the proxy data table, resulting in "virtual" cells that can be mapped to the data entries of the data structure. However, during the mapping, the proxy data table may remain empty and may not contain the data from the data structure or a copy thereof.

For example, in the simple example in which the data structure is itself a table, aspects of the proxy data table can map to the cells of the data structure. In this example, correlations in the mapping between locations in the proxy data table and associated locations in the data structure are generated using dynamically generated rows for the proxy data table, such that each location in the data structure is mapped to a corresponding dynamic row and static column in the proxy data table.

Mappings between different types of data structures are possible. For instance, one example of mapping between a proxy data table and an associative array involves mapping each dynamic row in the proxy data table to a corresponding key in the associative array. Each column of the proxy data table can then be mapped to one or more values associated with the corresponding key. Many more possible mapping schemes between the proxy data table and the data structure are similarly possible.

In some examples, the data access layer is configured to first detect whether a mapping is currently associated with the data structure. For instance, once a mapping is generated for a particular analysis operation or application configuration, it may be used for future operations. For instance, the upon generation of a mapping, a Boolean flag can be set that provides an indication to analytics software clients, the data access layer, or other applications that the mapping exists. In some examples, the Boolean flag can be checked for using, for example, a predefined macro.

In block 1408, the computer system receives an input to the second software program from the first software program indicating an operation to be performed by the second software program on the data structure. For example, the second software program and the first software program may be communicatively coupled as, for instance, over a network. The first software program may be used for certain analysis tasks or other tasks involving the data structure. A user of the first software program may desire a particular analysis operation to be performed by the second software program. The second software program may have, for example, more sophisticated analysis facilities, may use algorithms not available from the first software program, or may be able to perform the analysis more efficiently, among other possible motivations. The first software program may thus be configured to send an instruction to the second software program including a command to cause the desired analysis operation. The instruction may include an identification of the data structure, a subset of the data therein, an identification of the analysis operation, and/or other relevant information.

In block 1410, in response to receiving the input, the computer system instructs the second software program to perform the operation to generate a result. The second software program can, for example, execute commands to perform operations on the proxy data table, where the commands are received by the data access layer. The data access layer can then act as a bridge between the proxy data table and the underlying data structure. In one aspect, the second software program is configured to issue read commands corresponding to the set of columns of the proxy data table to the data access layer. In response to the issuance of these read commands, the data access layer can retrieve the corresponding data from the data access layer and return it to the second software program, so that the second software program can perform the analytics operation on the data, effectively allowing the analysis operation to be performed on the data contained in the data structure.

As noted above, the data access layer is configured to obtain the set of data entries and provide the set of data entries to the second software program as responses to the read commands. For example, the data access layer may receive commands from the second software program and execute analogous commands in the first software program, according to a relationship between an exposed API of the second software program to an exposed API of the first software program (e.g., a mapping or translation table). The techniques described herein can allow for a multi-language architecture in the sense that the first software program, which can be written in any programming language, can interface with the second software program, which can also be written in any programming language, through the data access layer using the mapping. An example of such a mapping is described in greater detail below with respect to FIG. 16.

A read command executed by the second software program against the proxy data table may, using the data access layer, use a mapping between the columns of the proxy data table and the data entries of the data structure to execute the read command against the data structure using the API of the first software program, and return the read data to the second software program. In this way, the data access layer determines which of the set of data entries to provide in response to each of the read commands by performing a translation between the set of data entries and the set of columns based on the mapping, including a computation of one or more dynamically generated rows for the proxy data table, resulting in "virtual" cells that can be mapped to the table cells of the data structure.

The data structure may also include a data buffer configured to provide buffered access to the set of data entries of the data structure, as described above. The data buffer can provide a means for the second software program to access the data in the data structure using the same memory-access APIs as the first software program. In some such examples, the data access layer is configured to retrieve the buffered set of data entries from the data buffer using the mapping to correlate the plurality of columns and dynamically computed rows to locations of the buffered plurality of data entries in the data buffer. For example, rather than executing read commands using the API of the first software program, access to the data buffers can instead be provided to the data access layer, which can then access the data in the data structure directly. Access to the data using the data buffers may in some cases be significantly faster and more efficient.

In some examples, for instance when data buffers are unavailable, the mapping may use one or more callback operations. The callback operations can be used to correlate the plurality of columns and dynamically computed rows to the plurality of data entries using, for example, preprogrammed retrieval methods available through the first software program. In this context, "callback operations" can include operations performed by the data access layer when data buffers are unavailable. Callback operations may be implemented as a failsafe approach to accessing the data in the data structure configured to work even when preferred methods (e.g., using data buffers) are not available. Callback operations may be configured as exposed API interfaces to be implemented by the data access layer using the multi-language architecture. For example, callback operations may include read, write, update, and delete operations that can be used for data access and manipulation by the data access layer in lieu of directly operating on the data in the data buffers.

In block 1412, the computer system outputs the result to the first software program. For example, the second software program may be analytics software performing an analysis operation. Upon completion of the operation, or a subset thereof, the result of the operation can be sent back to the first software program via a communication channel between the two software programs. For example, the second software program may find the maximum value of the numbers in the data structure. In this example, the maximum value may be returned to the first software program using a communicative coupling such as an exposed API. In another example, the second software program can sort the data in the data structure. In that case, the sorted data can be written back to the data structure using the data access layer.

Using the data access layer as described above comes with several technical advantages. Program code written in the second programming language that is executable by the second software program can effectively be executed on data in use by the first software program with no changes to the second programming language. This is enabled by a multi-language architecture that can be configured to enable the first software program to interact with APIs exposed by the second software program using the first programming language, without modifications to the APIs of the second programming language. Additionally, due to the multi-language architecture, the first software program can execute any desired operations, including those provided by the second programming language, using program code written in the first programming language.

Figure 15:
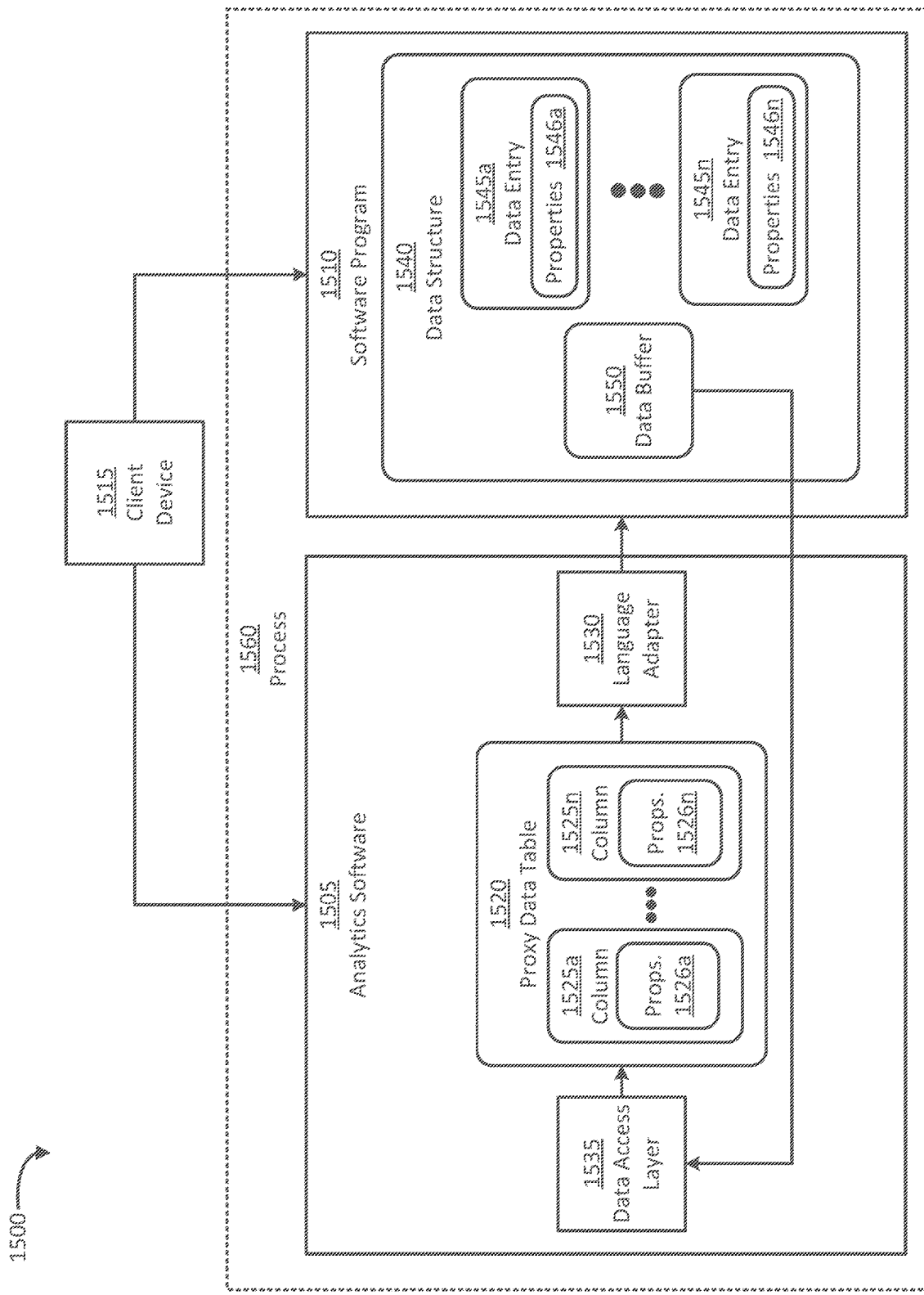
FIG. 15 shows an example of a system that can be used for providing a data access layer for translating between a data structure used by a first software program and a proxy table used by a second software program, according to some aspects of the present disclosure.

Turning now to FIG. 15, FIG. 15 shows an example of a system 1500 that can be used for providing a data access layer for translating between a data structure used by a first software program and a proxy table used by a second software program, according to some aspects of the present disclosure. The system 1500 may be deployed on one or more computing devices, such as a cloud computing system or computing cluster containing any number of nodes. The components depicted in the example system 1500 may be hosted together, separately, or any combination thereof. For instance, the analytics software 1505 and the software program 1510 may be communicatively coupled software components executed on the same computer system or disparate computer systems.

System 1500 includes analytics software 1505, which can be one non-limiting example of the "second software program" described above. The analytics software 1505 can be used for analysis of data in various formats such as tabular data. The analytics software 1505 can perform analysis operations optimized for large datasets and complex algorithms. For instance, the analytics software 1505 can be used for applications such as statistical modeling, trend analysis, and predictive analytics. Some examples of analytics software 1505 may include machine learning components for classification, prediction, generation, and so on. The analytics software 1505 can interpret one or more programming languages. For instance, the analytics software 1505 may provide components or controls for receiving instructions in the one or more programming languages and can execute the received instructions in the context of the executing analytics software 1505.

Analytics software 1505 may be operated using a client device 1515. The client device 1515 can be any suitable computing device. For example, the client device 1515 may be a desktop, laptop, tablet, smartphone, etc. The client device 1515 includes components such as a display device, an input device, and an output device. The display device may display a graphical user interface provided by the analytics software 1505.

In some examples, the analytics software 1505 can execute on a computing system or device which can itself include input and output devices for operation of the analytics software 1505. In this case, the client device 1515 can be a component of the analytics software 1505. For example, the analytics software 1505 may include multiple processes or components executing together, some of which perform analytics operations in the background, while others provide user interfaces to suitable output devices and receive inputs from suitable input devices.

System 1500 also includes a software program 1510, which can be one non-limiting example of the "first software program" described above. The software program 1510 can be an application that interprets a programming language that is different from the programming language interpreted by the analytics software 1505. For example, the software program 1510 may be written in the Python programming language or the R programming language. In this example, the software program 1510 may be able to interpret instructions in the Python programming language but not the programming languages used by the analytics software 1505. The software program 1510 may be executing continuously or on-demand, according to commands executed by a user of the software program 1510. The software program 1510 may likewise be operated or configured using client device 1515 or the like.

System 1500 depicts analytics software 1505 and the software program 1510 executing in a process 1560. The process 1560 may be, for example, an operating system process, thread, container, virtual machine, or other suitable in-memory computing abstraction. The process 1560 may be configured to execute analytics software 1505 and the software program 1510. The process 1560 may facilitate the sharing of information and resources between the analytics software 1505 and the software program 1510. For example, the data buffer 1550, including the plurality of data entries 1545a-1545n, may be mutually accessible between the two applications. Similarly, the data buffer 1550 and the proxy data table 1520 may both be accessible to the data access layer 1535.

The analytics software 1505, or a component therein, may receive information about a data structure 1540 used by the software program 1510. For example, if the software program 1510 is a Python application, the data structure 1540 may be a commonly used Python container such as a "DataFrame." A DataFrame, as implemented in the Python "Pandas" library, is a two-dimensional data structure similar to a database table or two-dimensional array. The data structure 154 may include a set of data entries 1545a-1545n, each of which has an associated set of properties 1546a-1546n. The properties 1546a-1546n include information about the data entries 1545a-1545n such as labels, data types, widths, precisions, and so on. The information about the data structure 1540 may be sent to the data access layer 1535 for initialization or configuration.

In some examples, the data structure 1540 can be instantiated or otherwise generated in concert with data buffer 1550. The data buffer 1550 can then be used to access the data in the data structure 1540 in lieu of executing commands to access the data directly in the data structure 1540. Use of the data buffer 1550 in this way may be faster or more efficient than direct access. In some examples, the data buffer 1550 is external to the data structure 1540. For example, the data buffer 1550 may be an in-memory copy of the data structure 1540 that can be accessed more efficiently using a different command set than that used for direct access to the data structure 1540. In some examples, the data buffer 1550 is accessible by the data access layer 1535 by reference or may be copied into the data access layer 1535. Data structure 1540 and its internals are shown with rounded corners to indicate that they are ephemeral components created, for example, in a memory of software program 1510.

The analytics software 1505 likewise includes a proxy data table 1520 that includes a set of columns 1525a-1525n, each of which has an associated set of properties 1526a-1526n. The properties 1526a-1526n include information about the columns 1525a-1525n that may differ from the properties 1546a-1546n of the data entries 1545a-1545n. For example, the properties 1526a-1526n of the columns 1525a-1525n may be configured to match the properties 1546a-1546n of the data entries 1545a-1545n as described below, but exact matches may not always be available. In other words, because the analytics software 1505 and the software program 1510 may interpret different programming languages, the details of their available data abstractions may differ as well. For instance, an example data entry of the data structure 1540 may be configured to hold a double precision floating point variable but the corresponding column of the proxy data table 1520 may only have a single precision floating point property available. Proxy data table 1520 and its internals are shown with rounded corners to indicate that they are ephemeral components created, for example, in a memory of analytics software 1505. The proxy data table 1520 may only have a header row (e.g., that identifies the various columns and their properties) and may not have any data rows.

The system 1500 can include a multi-language architecture that can be used for receiving commands executed by analytics software 1505, based on a first programming language, and then executing analogous commands in the software program 1510 based on a second programming language, and vice-versa. In system 1500, these functions are implemented by language adapter 1530. For example, instructions written in the first programming language may compile or otherwise be converted to bytecode or machine instructions. The binary API of the software program 1510 may itself be the result of instructions written in the second programming language that are compiled or otherwise be converted to bytecode or machine instructions, exposed a second binary API. The language adapter 1530 can include components for mapping this exposed API to an API of the software program 1510.

The language adapter 1530 may be implemented in other ways in accordance with the properties and APIs provided by various programming languages. For instance, the language adapter 1530 may execute instructions written in the first programming language directly, without first compiling them. In some examples, the language adapter 1530 may operate by way of a middleware component that can use messaging, a shared memory, or other inter-process communication techniques for translating instructions in the first programming language to the second programming language. And in some examples, the language adapter 1530 may wrap instructions in the second programming language using instructions from the first programming language using facilities provided for executing native code in the first programming language.

The system 1500 includes a data access layer 1535, which is shown in FIG. 15 as a component of the analytics software 1505, though in other examples the data access layer 1535 may be a separate component from the analytics software 1505. The data access layer 1535 can function as a bridge between the proxy data table 1520 and the data structure 1540. In particular, the data access layer 1535 can implement the mapping that correlates the properties 1526a-1526n of the set columns cells of the proxy data table 1520 to the properties 1546a-1546n of the set of data entries of the data structure 1540. In some examples, as alluded to above, the data access layer 1535 can interact with the data structure 1540 via the data buffer 1550. During analysis operations, the data access layer 1535 or another component can dynamically compute rows for the proxy data table 1520, resulting in "virtual" cells that can be mapped to the table cells of the data structure 1540. However, during the mapping, the proxy data table 1520 may remain empty and may not contain the data from the data structure 1540 or a copy thereof, even ephemerally.

If the proxy data table 1520 is mapped to a data structure 1540 that is a row- or column-based data table, the data access layer 1535 can receive read and other commands from the analytics software 1505 intended for execution on the proxy data table 1520, such that the proxy data table 1520 is effectively used as a proxy for the data structure 1540.

In some examples, the language adapter 1530 may be a component of the data access layer 1535. For example, the data access layer 1535 may be configured with a mapping that includes correlations between commands associated with the analytics software 1505 in one programming language and commands associated with software program 1510 in another programming language. The data access layer 1535 can, for example, receive a command written in a first programming language from the analytics software 1505 indicating a particular operation to be performed on the proxy data table 1520. The data access layer 1535 can translate, using the mapping, the command into a command written in a second programming language used by the software program 1510 and provide the translated command to the software program 1510 it to perform the operation on the data in the data structure. This process is described in more detail in description accompanying FIG. 16 below.

Figure 16:
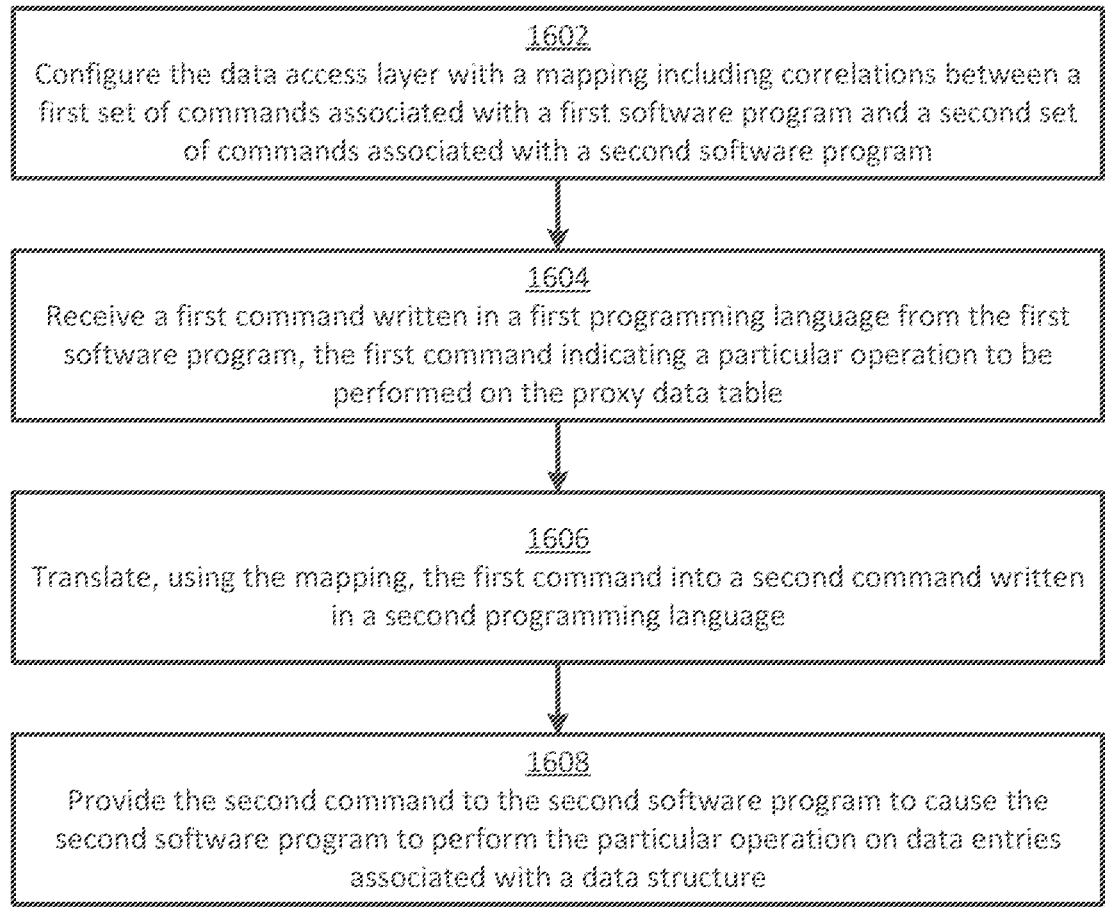
FIG. 16 shows a flowchart of an example of a process for using a multi-language architecture to implement a data access layer for translating between a data structure used by a first software program and a proxy table used by a second software program, according to some aspects of the present disclosure.

Turning now to FIG. 16, FIG. 16 shows a flowchart of an example of a process for using a multi-language architecture to implement a data access layer for translating between a data structure used by a first software program and a proxy table used by a second software program, according to some aspects of the present disclosure. The multi-language architecture may be implemented using the language adapter 1530 or the data access layer 1535 included in analytics software 1505 as described in FIG. 15. Other examples may involve more operations, fewer operations, different operations, or a different order of operations than is shown in FIG. 16.

In block 1602, the data access layer is configured with a mapping, including correlations between a first set of commands associated with a first software program and a second set of commands associated with a second software program. For example, the second software program may be analytics software 1505 of FIG. 15 and the first software program may be the software program 1510 of FIG. 15. The first set of commands are in a first programming language and the second set of commands are in a second programming language that is different from the first programming language. In this example, the mapping can be used to implement the multi-language architecture to enable the first software program to execute APIs exposed by the second software program using the first programming language.

In block 1604, the data access layer receives a first command written in the first programming language from the first software program, in which the first command indicates a particular operation to be performed on the proxy data table. The first set of commands may correspond to, for example, a set of database operations, such as create, read, update, and delete. The first set of commands may take a particular form in the first programming language. For example, a read command in the first programming language (e.g., Python) may be simply represented as "read_data (table_name, query_parameters)." The second set of commands may correspond to the same operation but take a quite different form in the second programming language.

In block 1606, the data access layer translates, using the mapping, the first command into a second command written in the second programming language. For example, an analogous read command in the second programming language (e.g., Java) may be simply represented as "public <T> List<T> readDatabase(String tableName, String columnName, T value, Class<T> typeClass)."

These examples are meant to illustrate the potential incompatibility that may exist between the same read command in two different programming languages. These examples illustrate incompatibilities in database APIs, and similar incompatibilities may exist at the binary API level. The data access layer includes components that enable the read command executed in the first programming language to execute the read command in the second programming language. The data access layer may include, for example, instructions to convert the information in the two function parameters of the first example to the four function parameters of the second example. Additional instructions may be needed beyond this simple example.

In block 1608, the data access layer provides the second command to the first software program to cause the first software program to perform the particular operation on the plurality of data entries associated with the data structure. For example, the mapped read command with the function parameters and other mapped elements may be provided to the first software program for execution. Execution of the second command by the first software program may be functionally identical to execution the first command by the second software program.

The above process can allow the data access layer to serve as an intermediary between the two software programs, so that read and write commands issued by the first software program can be fulfilled using the data in the data structure of the second software program.

Figure 17:
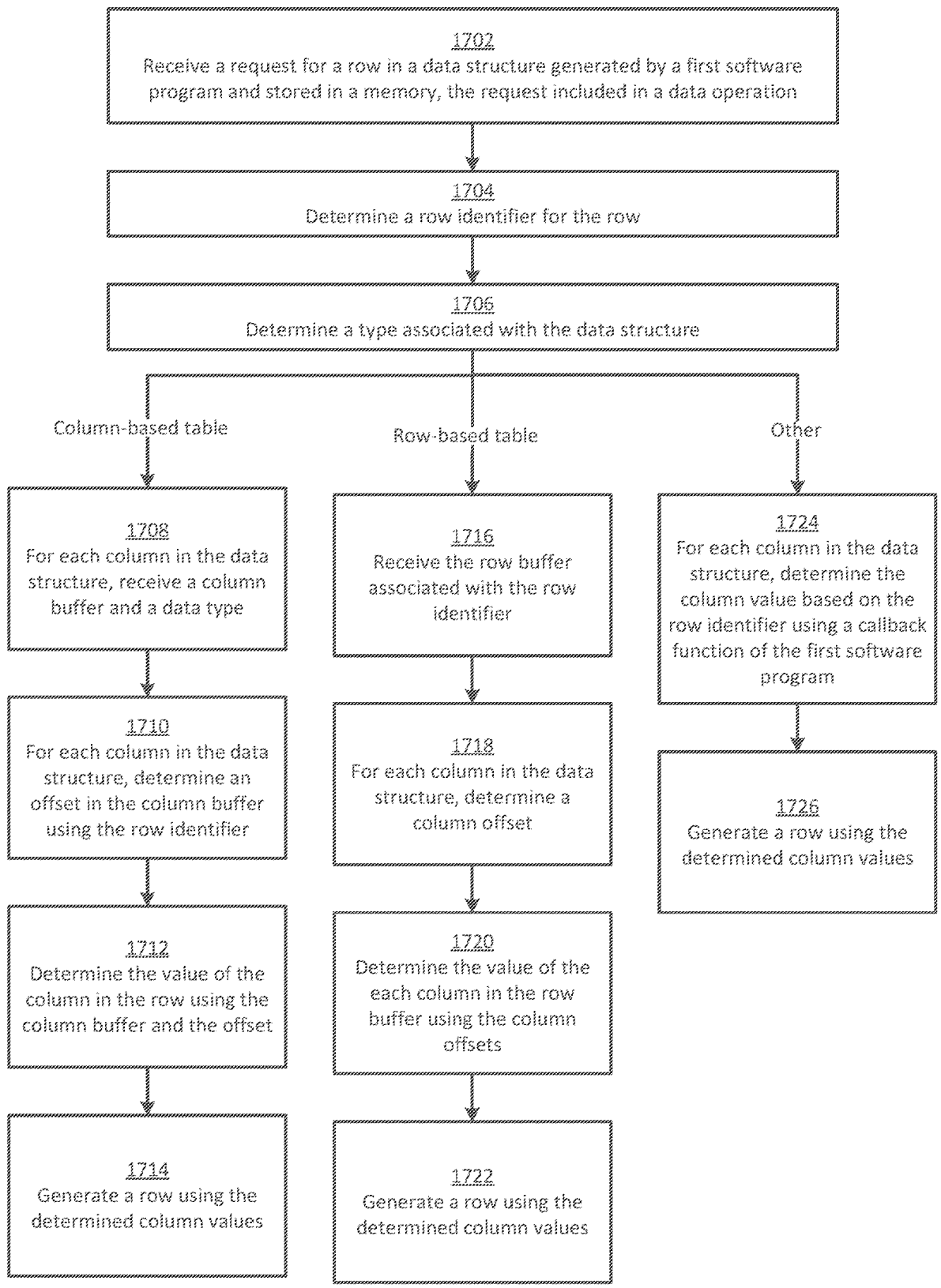
FIG. 17 shows a flowchart of an example of a process for accessing data in a data structure as part of implementing a data access layer for translating between a data structure used by a first software program and a proxy table used by a second software program, according to some aspects of the present disclosure.

FIG. 17 shows a flowchart of an example of a process for accessing data in a data structure as part of implementing a data access layer for translating between a data structure used by a first software program and a proxy table used by a second software program, according to some aspects of the present disclosure. The example process may be performed by, for example, the data access layer 1535 described in FIG. 15. Other examples may involve more operations, fewer operations, different operations, or a different order of operations than is shown in FIG. 17.

At block 1702, the data access layer receives a request for a row in a data structure, where the data structure was generated by a first software program and stored in a memory. The request can correspond to a data operation. For example, the data access layer may receive a command from analytics software to execute a read command on a proxy data table. The data access layer can receive the read command and responsively execute the read command on the data structure, rather than the proxy table. The request for a row in the data structure may be the read command or it may be part of a large read command, such as a command requesting multiple rows, columns, the entire data structure, or some other subset thereof.

At block 1704, the data access layer determines a row identifier for the row. For example, the row may be identified with a unique key such as a unique string or integer.

At block 1706, the data access layer determines a type associated with the data structure. For example, the data access layer may query or otherwise examine the data structure for metadata. The metadata may, for example, identify the data structure as a row-based data table, a column-based data table, or another type.

If the data structure is identified as a column-based table, at block 1708, the data access layer, for each column in the data structure, receives a column buffer and a data type. For instance, the data buffer for a column-based table may include one or more column buffers. The column buffers may include, in addition to the data in each respective column, metadata such as the data type or types in the particular column.

At block 1708, the data access layer, for each column in the data structure, determines an offset in the column buffer using the row identifier. For example, if the table includes 10 rows, then the specific row can be identified using the unique identifier. An offset corresponding to the identified row can then be determined. The identification of the offset may be based on a particular sorting of the data in the column to ensure consistency between queries when ordering is not guaranteed. Based on the offset, at block 1710, the data access layer determines the value of the column in the row using the column buffer and the offset.

This process can be repeated for each column or selected columns in the row. At block 1712, the data access layer generates a row using the determined column values. The determined column values may be, for example, assembled into a row object suitable for use by the second software program.

If the data structure is identified as a row-based table, the process is similar to that described with respect to selection of a row in blocks 1708-1712, except certain operations are transposed. At block 1716, the data access layer receives the row buffer associated with the unique row identifier. At block 1718, the data access layer, for each column in the data structure, determines a column offset, in contrast to the row offset of the column-based example. At block 1720, the data access layer determines the value of each column in a row buffer using the column offsets. This process can be repeated for each column or selected columns in the row. At block 1722, the data access layer generates a row using the determined column values. The determined column values may be, for example, assembled into a row object suitable for use by the second software program.

In some cases, the data structure may be identified as having a type other than a row-based or column-based table. For instance, the type may be unrecognized by the data access layer. In that case, at block 1724, the data access layer, for each column in the data structure, determines the column value based on the row identifier using a callback function of the first software program. The callback functions may be function or method interface definitions that have been implemented in the data access layer. For example, a callback function for a database read command may include the example function definition in one programming language (e.g., C#): "public delegate List<T> DatabaseReadCallback<T>(string tableName, string query)." The data access layer may include instructions implementing this read operation in the appropriate programming language that can be used for read operations in lieu of the ones described above with respect to blocks 1708-1722. The use of the callback operation may be functionally identical to the process of blocks 1708-1722.

At block 1726, the data access layer generates a row using the determined column values. As before, the determined column values may be, for example, assembled into a row object suitable for use by the second software program.

Figure 18:
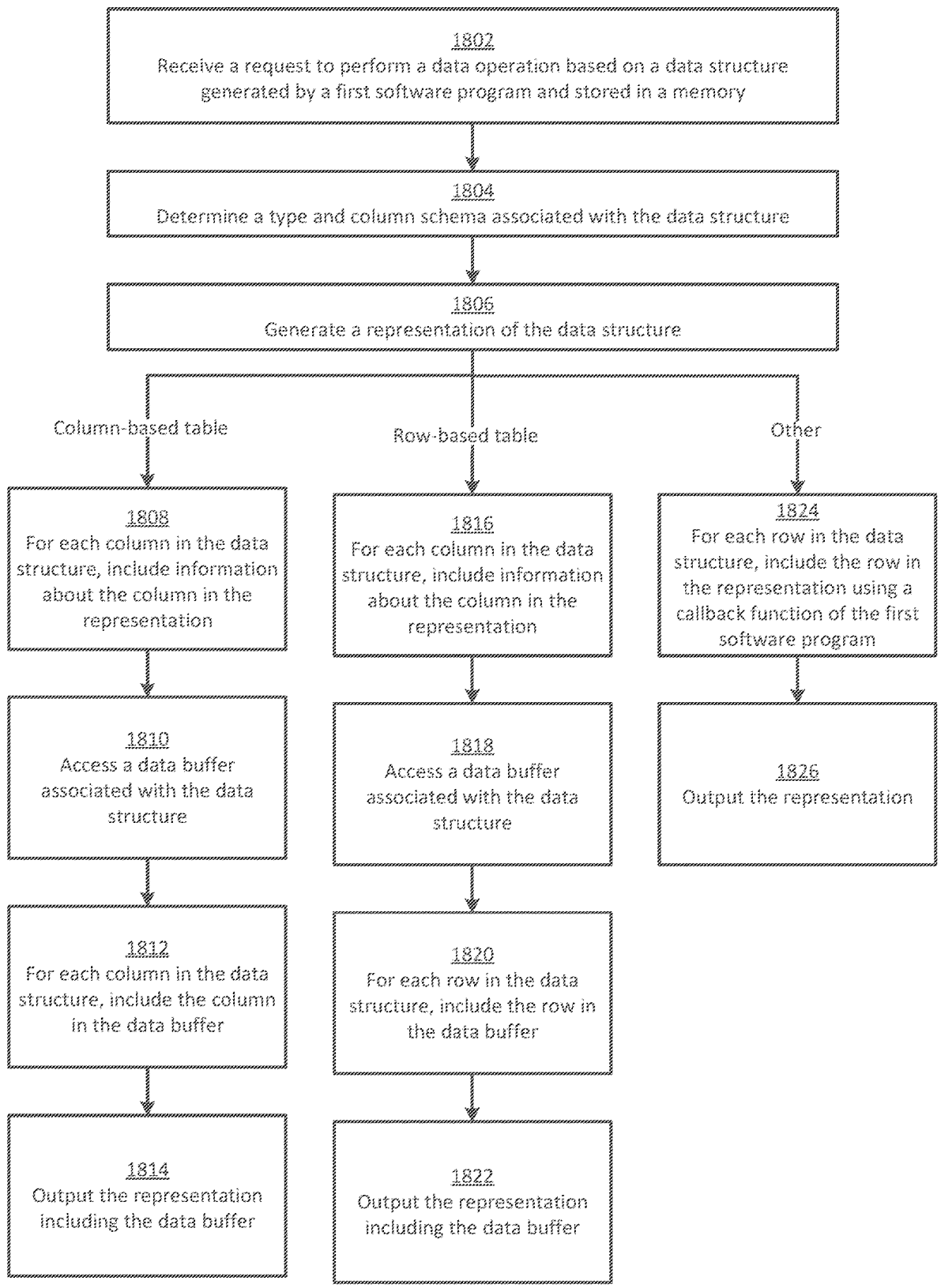
FIG. 18 shows a flowchart of another example of a process for accessing data in a data structure as part of implementing a data access layer for translating between a data structure used by a first software program and a proxy table used by a second software program, according to some aspects of the present disclosure.

FIG. 18 shows a flowchart of another example of a process for accessing data in a data structure as part of implementing a data access layer for translating between a data structure used by a first software program and a proxy table used by a second software program, according to some aspects of the present disclosure. The example process may be performed by, for example, the data access layer 1535 described in FIG. 15. Other examples may involve more operations, fewer operations, different operations, or a different order of operations than is shown in FIG. 18.

At block 1802, the data access layer receives a request to perform a data operation. The data operation can be associated with a data structure generated by a first software program and stored in a memory. For example, the data access layer may receive the request from a second software program such as an analytics software. The request can be handled by the data access layer, regardless of the format of the data structure, for example using any of the techniques described herein.

At block 1804, the data access layer determines a type and column schema associated with the data structure. For example, if the data structure is a database tables, then the schema may represent the rows and columns of the database table as obtained from suitable metadata included in the data structure itself or another location. The data access layer may likewise query or otherwise examine the metadata may to identify the data structure as a row-based data table, a column-based data table, or another type.

At block 1806, the data access layer generates a representation of the data structure. For instance, the data access layer may instantiate an object in memory that can be used to ephemerally store the data structure or a subset thereof in memory for processing by the analytics software. The object may include the data buffer or a reference to the data buffer.

If the data structure is identified as a column-based table, at block 1808, the data access layer, for each column in the data structure, includes information about the column in the representation. The information may be added to the object instantiated in block 1806. At block 1810, the data access layer accesses a data buffer associated with the data structure. For example, the representation may include a reference to the data buffer that can be used to indirectly access arbitrary locations in the data buffer using a suitable identification scheme.

At block 1812, the data access layer, for each column in the data structure, includes the column in the data buffer. The data access layer may thus populate the data buffer, if it is not already populated, with the corresponding values from the column of the data structure. At block 1814, the data access layer outputs the representation including the data buffer. The representation may be available for analysis operations by the analytics software.

If the data structure is identified as a row-based table, the process is similar to that described with respect to selection of a row in blocks 1808-1812, except certain operations are transposed. At block 1816, the data access layer, for each column in the data structure, includes information about the column in the representation. At block 1818, the data access layer, accesses a data buffer associated with the data structure, which may be referenced in the representation using a pointer to memory other suitable abstraction. At block 1820, the data access layer, for each row in the data structure, includes the row in the data buffer. In some examples, the data buffer may be pre-populated in accordance with the particular implementation in the first software programming or the constraints of the associated programming language. At block 1822, the data access layer outputs the representation including the data buffer. The representation may again be available for analysis operations by the analytics software.

If the data structure is identified as having a type other than a row-based or column-based table, at block 1824, the data access layer, for each row in the data structure, includes the row in the representation using a callback function of the first software program. As in FIG. 17, the callback functions may be function or method interface definitions that have been implemented in the data access layer when the identified data structure type is not directly supported in the data access layer or is unrecognized. The callback functions thus can function as a failsafe mechanism configured to operate in unanticipated cases. At block 1826, the data access layer outputs the representation. The representation may again be available for analysis operations by the analytics software.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:
1. A computing device, comprising:
one or more processors; and
one or more memories including program code that is executable by the one or more processors to:
receive information about a data structure generated by a first software program and stored in a memory of the one or more memories, the data structure including a plurality of data entries, wherein the information about the data structure indicates a first set of properties for each data entry of the plurality of data entries, the first software program being stored in the one or more memories;
generate a proxy data table that includes a plurality of columns, each column having an associated second set of properties, the proxy data table being usable as a proxy for the data structure by a second software program, the second software program being stored in the one or more memories;
use a data access layer to generate a mapping that correlates the second set of properties of the plurality of columns of the proxy data table to the first set of properties of the plurality of data entries of the data structure, the data access layer being a third software program stored in the one or more memories;
receive an input to the second software program from the first software program indicating an operation to be performed by the second software program on the data structure;
in response to receiving the input:
instruct the second software program to perform the operation to generate a result, wherein:
the second software program is configured to issue read commands corresponding to the plurality of columns to the data access layer for performing the operation on the proxy data table; and
the data access layer is configured to obtain the plurality of data entries and provide the plurality of data entries to the second software program as responses to the read commands, wherein:
the data access layer is further configured to determine which of the plurality of data entries to provide in response to each of the read commands by performing a translation between the plurality of data entries and the plurality of columns based on the mapping; and
output, by the second software program, the result to the first software program.

2. The computing device of claim 1, wherein the data structure includes a data buffer, the data buffer being stored in the one or more memories and configured to provide buffered access to the plurality of data entries of the data structure, wherein the data access layer is configured to retrieve the buffered plurality of data entries from the data buffer, and wherein the mapping correlates the plurality of columns to locations of the buffered plurality of data entries in the data buffer.

3. The computing device of claim 1, wherein the mapping further comprises one or more callback operations that correlate the plurality of columns to the plurality of data entries.

4. The computing device of claim 1, wherein the first software program is configured to interpret a first programming language, the second software program is configured to interpret a second programming language that is different from the first programming language, and the second software program is configured to interface with the first software program.

5. The computing device of claim 1, wherein the data structure is a two-dimensional data table comprising one or more rows and one or more columns, each column having a corresponding data type.

6. The computing device of claim 1, wherein the data access layer is further configured to detect whether the mapping is associated with the data structure.

7. The computing device of claim 1, further comprising an in-memory process configured to execute the second software program and the first software program, wherein the in-memory process further includes a data buffer including the plurality of data entries, the data buffer and the proxy data table both being accessible to the data access layer.

8. The computing device of claim 1, wherein the mapping comprises in the proxy data table and associated locations in the data structure, wherein each location in the data structure is characterized by a row and column.

9. The computing device of claim 1, wherein the data access layer is further configured with a second mapping, the second mapping including correlations between a first set of commands associated with the first software program and a second set of commands associated with the second software program, the first set of commands being in a first programming language and the second set of commands being in a second programming language that is different from the first programming language.

10. The computing device of claim 9, wherein the data access layer is further configured to:
receive a first command written in the second programming language from the second software program, the first command indicating a particular operation to be performed on the proxy data table;
translate, using the second mapping, the first command into a second command written in the first programming language; and
provide the second command to the first software program for causing the first software program to perform the particular operation on the plurality of data entries associated with the data structure.

11. A method comprising:
receiving information about a data structure generated by a first software program and stored in a memory, the data structure including a plurality of data entries, wherein the information about the data structure indicates a first set of properties for each data entry of the plurality of data entries, the first software program being stored in the memory;
generating a proxy data table that includes a plurality of columns, each column having an associated second set of properties, the proxy data table being usable as a proxy for the data structure by a second software program, the second software program being stored in the memory;
using a data access layer to generate a mapping that correlates the second set of properties of the plurality of columns of the proxy data table to the first set of properties of the plurality of data entries of the data structure, the data access layer being a third software program stored in the memory;
receiving an input to the second software program from the first software program indicating an operation to be performed by the second software program on the data structure;
in response to receiving the input:
instructing the second software program to perform the operation to generate a result, wherein:
the second software program is configured to issue read commands corresponding to the plurality of columns to the data access layer for performing the operation on the proxy data table; and
the data access layer is configured to obtain the plurality of data entries and provide the plurality of data entries to the second software program as responses to the read commands, wherein:
the data access layer is further configured to determine which of the plurality of data entries to provide in response to each of the read commands by performing a translation between the plurality of data entries and the plurality of columns based on the mapping; and
outputting, by the second software program, the result to the first software program.

12. The method of claim 11, wherein the data structure includes a data buffer, the data buffer being stored in the memory and configured to provide buffered access to the plurality of data entries of the data structure, wherein the data access layer is configured to retrieve the buffered plurality of data entries from the data buffer, and wherein the mapping correlates the plurality of columns to locations of the buffered plurality of data entries in the data buffer.

13. The method of claim 11, wherein the mapping further comprises one or more callback operations that correlate the plurality of columns to the plurality of data entries.

14. The method of claim 11, wherein the first software program is configured to interpret a first programming language, the second software program is configured to interpret a second programming language that is different from the first programming language, and the second software program is configured to interface with the first software program.

15. The method of claim 11, wherein the data structure is a two-dimensional data table comprising one or more rows and one or more columns, each column having a corresponding data type.

16. The method of claim 11, wherein the data access layer is further configured to detect whether the mapping is associated with the data structure.

17. The method of claim 11, further comprising an in-memory process configured to execute the second software program and the first software program, wherein the in-memory process further includes a data buffer including the plurality of data entries, the data buffer and the proxy data table both being accessible to the data access layer.

18. The method of claim 11, wherein the mapping comprises correlations between locations in the proxy data table and associated locations in the data structure, wherein each location in the data structure is characterized by a row and column.

19. The method of claim 11, wherein the data access layer is further configured with a second mapping, the second mapping including correlations between a first set of commands associated with the first software program and a second set of commands associated with the second software program, the first set of commands being in a first programming language and the second set of commands being in a second programming language that is different from the first programming language.

20. The method of claim 19, wherein the data access layer is further configured to:
receive a first command written in the second programming language from the second software program, the first command indicating a particular operation to be performed on the proxy data table;

translate, using the second mapping, the first command into a second command written in the first programming language; and provide the second command to the first software program for causing the first software program to perform the particular operation on the plurality of data entries associated with the data structure.

21. A non-transitory computer-readable medium comprising program code that is executable by one or more processors for causing the one or more processors to:

receive information about a data structure generated by a first software program and stored in a memory, the data structure including a plurality of data entries, wherein the information about the data structure indicates a first set of properties for each data entry of the plurality of data entries, the first software program being stored in the non-transitory computer-readable medium;

generate a proxy data table that includes a plurality of columns, each column having an associated second set of properties, the proxy data table being usable as a proxy for the data structure by a second software program, the second software program being stored in the non-transitory computer-readable medium;

use a data access layer to generate a mapping that correlates the second set of properties of the plurality of columns of the proxy data table to the first set of properties of the plurality of data entries of the data structure, the data access layer being a third software program stored in the non-transitory computer-readable medium;

receive an input to the second software program from the first software program indicating an operation to be performed by the second software program on the data structure;

in response to receiving the input:
instruct the second software program to perform the operation to generate a result, wherein:
the second software program is configured to issue read commands corresponding to the plurality of columns to the data access layer for performing the operation on the proxy data table; and
the data access layer is configured to obtain the plurality of data entries and provide the plurality of data entries to the second software program as responses to the read commands, wherein:
the data access layer is further configured to determine which of the plurality of data entries to provide in response to each of the read commands by performing a translation between the plurality of data entries and the plurality of columns based on the mapping; and
output, by the second software program, the result to the first software program.

22. The non-transitory computer-readable medium of claim 21, wherein the data structure includes a data buffer, the data buffer being stored in the non-transitory computer-readable medium and configured to provide buffered access to the plurality of data entries of the data structure, wherein the data access layer is configured to retrieve the buffered plurality of data entries from the data buffer, and wherein the mapping correlates the plurality of columns to locations of the buffered plurality of data entries in the data buffer.

23. The non-transitory computer-readable medium of claim 21, wherein the mapping further comprises one or more callback operations that correlate the plurality of columns to the plurality of data entries.

24. The non-transitory computer-readable medium of claim 21, wherein the first software program is configured to interpret a first programming language, the second software program is configured to interpret a second programming language that is different from the first programming language, and the second software program is configured to interface with the first software program.

25. The non-transitory computer-readable medium of claim 21, wherein the data structure is a two-dimensional data table comprising one or more rows and one or more columns, each column having a corresponding data type.

26. The non-transitory computer-readable medium of claim 21, wherein the data access layer is further configured to detect whether the mapping is associated with the data structure.

27. The non-transitory computer-readable medium of claim 21, further comprising an in-memory process configured to execute the second software program and the first software program, wherein the in-memory process further includes a data buffer including the plurality of data entries, the data buffer and the proxy data table both being accessible to the data access layer.

28. The non-transitory computer-readable medium of claim 21, wherein the mapping comprises correlations between locations in the proxy data table and associated locations in the data structure, wherein each location in the data structure is characterized by a row and column.

29. The non-transitory computer-readable medium of claim 21, wherein the data access layer is further configured with a second mapping, the second mapping including correlations between a first set of commands associated with the first software program and a second set of commands associated with the second software program, the first set of commands being in a first programming language and the second set of commands being in a second programming language that is different from the first programming language.

30. The non-transitory computer-readable medium of claim 29, wherein the data access layer is further configured to:

receive a first command written in the second programming language from the second software program, the first command indicating a particular operation to be performed on the proxy data table;

translate, using the second mapping, the first command into a second command written in the first programming language; and provide the second command to the first software program for causing the first software program to perform the particular operation on the plurality of data entries associated with the data structure.

* * * * *